(12) United States Patent
Blumenschein et al.

(10) Patent No.: US 10,948,989 B1
(45) Date of Patent: Mar. 16, 2021

(54) APPARATUSES, SYSTEMS, AND METHODS FOR ACTUATING A CONTACT SURFACE

(71) Applicant: Facebook Technologies, LLC, Menlo Park, CA (US)

(72) Inventors: Laura Blumenschein, Redmond, WA (US); Nathan Scot Usevitch, Redmond, WA (US); Jan Fras, Redmond, WA (US); Thomas John Farrell Wallin, Redmond, WA (US); Yigit Menguc, Kirkland, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 29 days.

(21) Appl. No.: 16/233,162

(22) Filed: Dec. 27, 2018

Related U.S. Application Data

(60) Provisional application No. 62/753,741, filed on Oct. 31, 2018.

(51) Int. Cl.
*G06F 3/01* (2006.01)
*G02B 27/01* (2006.01)

(52) U.S. Cl.
CPC .......... *G06F 3/014* (2013.01); *G02B 27/017* (2013.01); *G06F 3/016* (2013.01)

(58) Field of Classification Search
CPC ..... F16J 3/04; F16J 3/041; F16J 3/048; G06F 3/014; G06F 3/016; G02B 27/017
See application file for complete search history.

(56) References Cited

U.S. PATENT DOCUMENTS

| | | | | |
|---|---|---|---|---|
| 3,090,395 A | * | 5/1963 | Weiss | G05D 13/00 137/86 |
| 3,945,565 A | * | 3/1976 | Lynch | F24F 13/1426 236/49.4 |
| 4,559,866 A | * | 12/1985 | Brenner | G05B 11/50 92/39 |
| 8,593,420 B1 | * | 11/2013 | Buuck | G06F 3/016 345/173 |
| 2014/0214206 A1 | * | 7/2014 | Steinberg | G06F 3/016 700/258 |

(Continued)

OTHER PUBLICATIONS

Pikul et al., "Stretchable surfaces with programmable 3D texture morphing for synthetic camouflaging skins", Programmed Materials, Science 358, Oct. 13, 2017, 5 pages.

(Continued)

*Primary Examiner* — Thomas E Lazo
(74) *Attorney, Agent, or Firm* — FisherBroyles, LLP

(57) ABSTRACT

An actuation apparatus may be configured to apply forces to a user's skin using flexible-membrane actuators. Such an apparatus may include (i) an array of actuator chambers that include a flexible material layer enclosing a changeable volume of fluid, (ii) a contact surface that is coupled to each actuator chamber, and (iii) a support framework that is coupled to the actuator chambers such that the array of actuator chambers is disposed between the support framework and the contact surface, and such that distortion of actuator chambers caused by changing the volume of fluid within the actuator chambers causes the array of actuator chambers to exert forces on the contact surface and cause movement of the contact surface.

19 Claims, 14 Drawing Sheets

(56) References Cited

U.S. PATENT DOCUMENTS

2015/0143990 A1* 5/2015 Van Buskirk .......... F01B 19/04
                                                                                    92/37

OTHER PUBLICATIONS

Stanley et al., "Haptic Jamming: A Deformable Geometry, Variable Stiffness Tactile Display using Pneumatics and Particle Jamming", IEEE World Haptics Conference 2013, Apr. 14-18, 2013, pp. 25-30.
Mitsuda, Takashi, "Variable-Stiffness Sheets Obtained using Fabric Jamming and their Applications in Force Displays", Proceedings of the IEEE World Haptics Conference (WHC), Jul. 27, 2017, 6 pages.
Besse et al., "Understanding Graphics on a Scalable Latching Assistive Haptic Display Using a Shape Memory Polymer Membrane", IEEE Transactions on Haptics, vol. 11, No. 1, Jan.-Mar. 1, 2018, pp. 1-9.
Lindenroth et al., "Design of a soft, parallel end-effector applied to robot-guided ultrasound interventions", IEEE/RSJ International Conference on Intelligent Robots and Systems (IROS), Sep. 24-28, 2017, pp. 3716-3721.

* cited by examiner

Bellows-Configuration Actuator 404

Bellows-Configuration Actuator 402

US 10,948,989 B1

APPARATUSES, SYSTEMS, AND METHODS FOR ACTUATING A CONTACT SURFACE

CROSS REFERENCE TO RELATED APPLICATION

This application claims the benefit of U.S. Provisional Application No. 62/753,741, filed 31 Oct. 2018, the disclosures of which are incorporated, in their entirety, by this reference.

BACKGROUND

Augmented reality and virtual reality systems may use wearable devices (such as a haptic glove) to give users the perception that they are interacting with virtual objects. These wearable devices may include shape displays to convey tactile information to a user. For example, a traditional shape display may include an array of pins that can be individually raised or lowered to recreate the surface features of an object. When a user interacts with a shape display, the shape display may reproduce sensations meant to approximate the displayed object.

However, traditional shape displays suffer from a variety of limitations. For example, the haptic resolution of a pin-array shape display may be limited by the spacing and/or positioning of the pins. Similarly, the dimensions of each pin may limit the haptic resolution of the pin-array shape display. Moreover, each pin may only move perpendicular to the surface of the shape display, thereby limiting the producible sensations to normal-angle pressure. Other types of shape displays may be bulky and/or incorporate mechanical components vulnerable to locking. The instant disclosure therefore identifies and addresses a need for apparatuses, systems, and methods for actuating a contact surface.

SUMMARY

As will be described in greater detail below, the instant disclosure describes various apparatuses, systems, and methods for actuating a contact surface using fluid-driven actuator chambers. An apparatus for actuating a contact surface may include a group of actuator chambers. Each actuator chamber may include a flexible material layer that is configured to contain a volume of fluid such that changing the volume of fluid contained within the actuator chamber causes the actuator chamber to distort at least along an actuation axis. Each actuator chamber may also include an inlet that enables an external control system to change the volume of fluid contained within the actuator chamber, and a contact surface that is coupled to each actuator chambers. The apparatus may further include a support framework that is coupled to the group of actuator chambers such that (i) the actuator chambers are disposed between the support framework and the contact surface and (ii) distortion of the actuator chambers causes the actuator chambers to exert forces on the contact surface, thereby causing movement of the contact surface.

In some embodiments, the apparatus may additionally include a support structure that is configured to secure the apparatus to a user's finger such that the contact surface maintains physical contact with a user's finger.

The group of actuator chambers may include various types of actuator chambers. For example, the group of actuator chambers may include at least one bellows-configuration actuator chamber. Distortion of a bellows-configuration actuator chamber may cause the bellows-configuration actuator chamber to exert a force along the actuation axis of the bellows-configuration actuator chamber. Additionally or alternatively, the group of actuator chambers may include at least one zig-zag configuration actuator chamber. Each zig-zag configuration actuator chamber may include rigid segments alternating with flexible corner segments such that increasing the volume of fluid enclosed by the zig-zag configuration actuator chamber causes the flexible corner segments to distort, thereby separating the rigid segments and applying a force along the actuation axis of the zig-zag configuration actuator chamber.

The actuator chambers may be organized and/or arranged in any suitable fashion. In some embodiments, the actuation axis of each actuator may lie along a single plane, thereby enabling the plurality of actuation chambers to move the contact surface with two degrees of freedom. In further embodiments, the actuation axis of each actuator chamber may be angled towards an outer surface of the contact surface, thereby enabling the plurality of actuation chambers to move the contact surface with three degrees of freedom. Moreover, the actuation axis of each actuator chamber may be offset from the center of the contact surface such that distortion of the plurality of actuator chambers effects a rotational force upon the contact surface.

In some examples, an actuator chamber may be a serial actuation chamber. A serial actuation chamber may include at least two independent interior chambers that each include an independent inlet, thereby enabling each independent interior chamber to contain an independent volume of fluid.

The actuation chambers may be filled with a variety of fluids. In some embodiments, the fluid may be a gas, such as atmospheric air.

A system for actuating a contact surface may include a group of haptic feedback apparatuses. Each haptic feedback apparatus may include one or more actuator chambers. Each actuator chamber may include a flexible material layer that is configured to contain a volume of fluid such that changing the volume of fluid contained within the actuator chamber causes the actuator chamber to distort at least along an actuation axis. Each actuator chamber may also include an inlet that enables an external control system to change the volume of fluid contained within the actuator chamber, and a contact surface that is coupled to each actuator chambers. The apparatus may further include a support framework that is coupled to the group of actuator chambers such that (i) the actuator chambers are disposed between the support framework and the contact surface and (ii) distortion of the actuator chambers causes the actuator chambers to exert forces on the contact surface, thereby causing movement of the contact surface. The system may also include a flexible support component that is configured to fit over a user's hand and hold the contact surface of each haptic feedback apparatus in physical contact with a corresponding portion of the user's hand.

A method for actuating a contact surface may include altering an internal pressure of an actuation chamber within a plurality of actuator chambers. Each actuator chamber may include a flexible material layer that is configured to contain a volume of fluid such that changing the volume of fluid contained within the actuator chamber causes the actuator chamber to distort at least along an actuation axis. Each actuator chamber may also include an inlet that enables an external control system to change the volume of fluid contained within the actuator chamber, and a contact surface that is coupled to each actuator chambers. Additionally, each actuator chamber may be disposed between and coupled to both a support framework and a contact surface. The method may further include altering the internal pressure of the actuation chamber, distorting the actuation chamber, and thereby causing the actuation chamber to exert a force on the contact surface along the actuation axis of the actuation chamber, thus causing movement of the contact surface Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
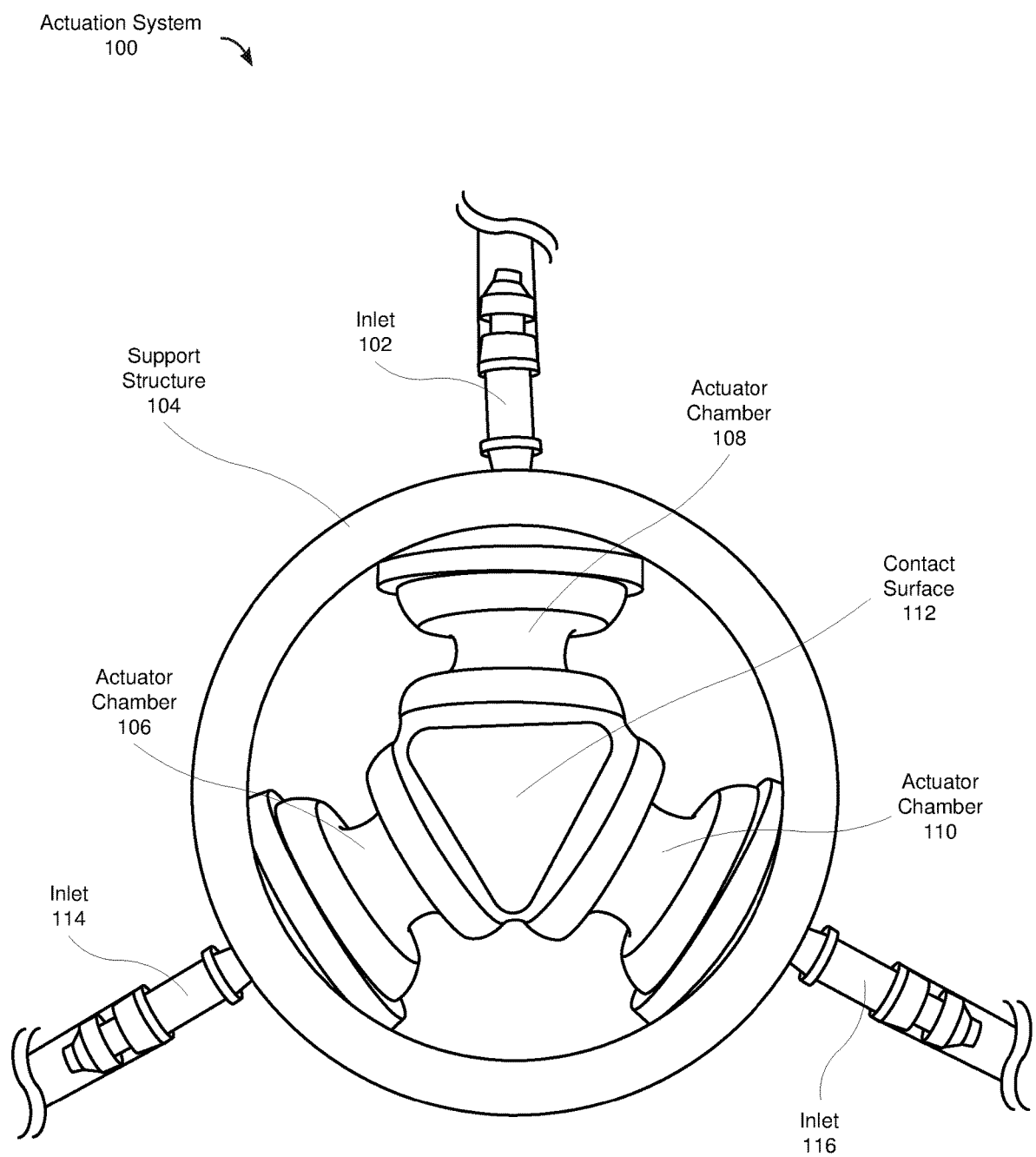
FIG. 1 is a schematic diagram of an example system for actuating a contact surface.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed towards an apparatus, system, and method that uses fluid-driven actuator chambers to manipulate a contact surface. As will be explained in greater detail below, embodiments of the instant disclosure may include a variety of soft or pliable actuators that, acting in concert, manipulate the position of a contact surface. Though the output of a single actuator may be simple (i.e., a single actuator may only produce force along a single axis), the construction into a parallel network may allow for complex movements with varying dimensions of freedom. Additionally, the collective output of multiple actuators acting in concert may generate more force than a single component actuator.

As may be appreciated from the preceding descriptions, the elastic, fluidics-based actuators described herein may be resilient against mechanical 'locking,' as each individual actuator may include pliable components that deform to accommodate competing forces, then spring back into position once those competing forces are removed. Moreover, the soft or pliable actuators described herein may be manufactured to smaller sizes than traditional actuation systems that rely on levers or gears, thus eliminating the bulk that makes traditional actuation systems unsuitable for use in various haptic feedback systems. Moreover, fluidics-based actuation systems may be controllable by systems that are removed from the point of actuation (e.g., a user's fingertip), as fluidics systems may only require simple tubes or channels to control an array of actuators rather than bulky gears, pistons, or motors required by traditional systems.

The following will provide, with reference to FIG. 1 detailed descriptions of an example system for actuating a contact surface. Detailed descriptions of various actuators will be provided in connection with FIGS. 2-4. Detailed descriptions of tilt-configuration actuation systems will be provided in connection with FIG. 5. Detailed descriptions of serial actuation chambers will be provided in connection with FIG. 6. Additionally, descriptions of an example anchoring system to hold the actuation system in contact with a user's fingertip will be provided in connection with FIG. 7. Descriptions of artificial reality, augmented reality, and/or virtual reality systems that may incorporate the above-referenced actuation systems will be provided in connection with FIGS. 8-10.

FIG. 1 is a schematic diagram of an example actuation system 100. Actuation system 100 may include a variety of components. As illustrated in FIG. 1, actuation system 100 may include several actuator chambers, illustrated in FIG. 1 as actuator chambers 106, 108, and 110. Each actuator chamber may include a flexible material layer that is configured to contain a volume of fluid (e.g., a liquid or a gas, such as water or air). Changing the volume of fluid contained within an actuator chamber may cause the actuator chamber to distort at least along an actuation axis. These actuator chambers will be described in greater detail below. Each actuator chamber may be connected to a corresponding inlet that enables an external control system to change the volume of fluid contained within the actuator chamber. In the example of FIG. 1, actuator chamber 106 is coupled to inlet 114, actuator chamber 108 is connected to inlet 102, and actuator chamber 110 is connected to inlet 116. An external control system may use these inlets to independently control the volume of fluid contained within each actuator chamber, thereby causing each actuator chamber to apply differing forces to the centrally disposed contact surface. These differing forces may thus control the position and apparent stiffness of contact surface 112.

The actuator chambers may be coupled to and disposed between support structure 104 and contact surface 112. In general, support structure 104 may provide a physical anchor for the actuation chambers, thereby allowing distortion of the actuator chambers to cause the actuator chambers to exert forces on contact surface 112. These forces caused by the distortion of the actuator chambers may cause movement of contact surface 112 relative to support structure 104. Additionally or alternatively, various control schemes may alter the apparent stiffness of actuation system 100 by simultaneously pressurizing multiple actuator chambers.

The term "apparent stiffness" as used herein generally refers to a resistance to being repositioned by forces external to the actuation system. For example, a user may place their finger in contact with contact surface 112 and push against contact surface 112. Control settings of actuation system 100 that actuate contact surface 112 to a high apparent stiffness may cause contact surface 112 to resist movement caused by the force applied by the user's finger. Conversely, a setting of actuation system 100 that actuates contact surface 112 to a low apparent stiffness may allow the force applied by the user's finger to overcome the fluidic pressures of the actuation chambers and move contact surface 112 against the actuation forces exerted by the actuation chambers. As a specific example, pressurizing all three actuation chambers of actuation system 100 may over-constrain the system, thereby increasing the apparent stiffness in the position of contact surface 112.

Actuation system 100 may be formed from a variety of materials. For example, some or all of actuation system 100 may be formed from any of a variety of metals, plastics, laminates, resins, rubbers, composite materials, and/or any other suitable material and/or combination of materials. Furthermore, actuation system 100 may be formed using a variety of techniques, such as 3-D printing, injection molding, thermoforming, die-casting, cutting, lamination, extrusion, co-extrusion, polyjet multi-material printing, and/or any other suitable technique or combination of techniques. In some embodiments, actuation system 100 may be fabricated as a single piece, such as through polyjet multi-material printing. Alternatively, various components of actuation system 100 may be manufactured individually using suitable manufacturing methods and then fastened together with screws, pins, glues, and/or any other suitable means of fastening two objects together. The above-described techniques are merely provided as examples to illustrate certain methods by which actuation system 100 may be manufactured, as any suitable manufacturing technique and/or techniques may be used to produce actuation system 100. Any suitable technique and/or combination of techniques may be used to create the apparatuses and systems described herein. For example, certain material printing techniques such as polyjet multi-material printing may be capable of printing the entire apparatus as a single piece.

Although the example of FIG. 1 illustrates an array of three identical fluidics chambers connected to an outer anchoring ring, actuation systems may include any number of fluidics chambers. For example, an actuation system may include four, five, six, or more actuation chambers. In some embodiments, particularly those incorporating large numbers of actuator chambers, the flexible material layers of the various actuation chambers may overlap. In other words, two or more actuation chambers may share all or a portion of a flexible material layer despite enclosing separate and distinct interior chambers. Furthermore, the actuation chambers in an actuation system may be of differing types, as certain designs of actuation chambers may perform better in certain roles (e.g., managing apparent stiffness, or managing actuation position of the contact surface). For example, one subset of actuation chambers in an actuation system may include the bellows-configuration actuation chambers described below, while a second subset of actuation chambers includes the z-configuration actuation chambers described below. Additionally or alternatively, an array of actuation chambers may include one or more of the serial actuation chambers described below in connection with FIG. 6.

Moreover, support structure 104 may take any suitable shape to ensure that the actuation chambers are able to apply force to contact surface 112. For example, support structure 104 may take the shape of the ring illustrated in FIG. 1. In further examples, support structure 104 may be a hemisphere, complex framework, or any other suitable structure to anchor actuator chambers so that the actuator chambers are able to apply force to contact surface 112. Furthermore, support structure 104 may include additional features, such as anchors for securing support structure 104 to an additional framework (e.g., anchoring system 704 in FIG. 7 and/or glove body 1010 in FIG. 10). Support structure 104 may also include channels and/or other features to permit external control systems to alter the volume of fluid within actuation chambers. For example, support structure 104 as illustrated in FIG. 1 includes channels through the structure of support structure 104 that connect the illustrated inlets to the corresponding inlets of each actuation chamber.

Figure 2:
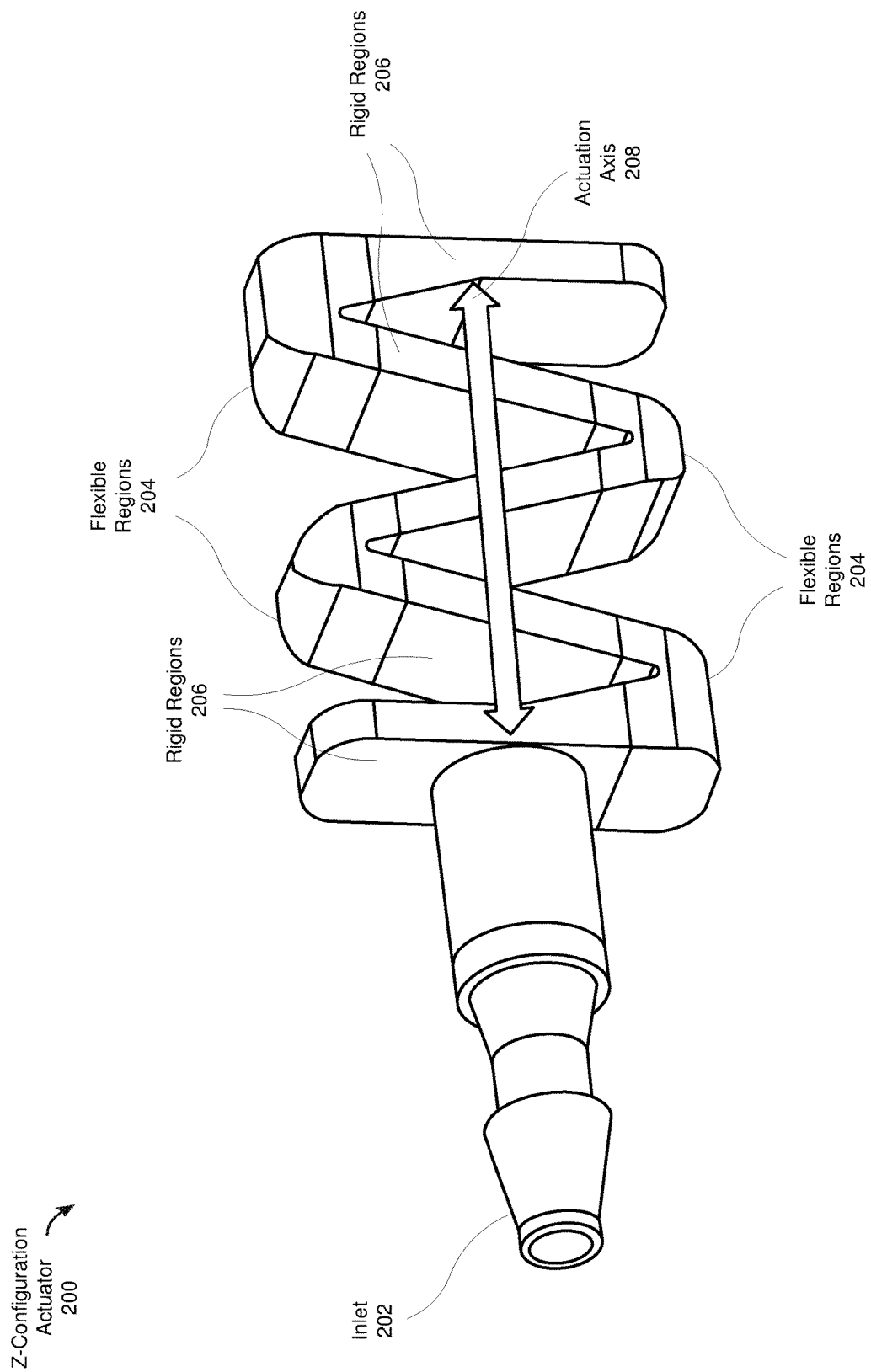
FIG. 2 is a schematic diagram of an example Z-configuration actuator.

As described above, actuation system 100 may include various types of actuators. FIG. 2 is a schematic diagram of an example z-configuration actuator 200. In general, z-configuration actuator 200 may include rigid regions 206 arranged in an alternating pattern with flexible corner segments, illustrated as flexible regions 204. Increasing the volume of fluid within z-configuration actuator 200 by, for example, pumping fluid into z-configuration actuator 200 through inlet 202, may cause flexible regions 204 to distort. Specifically, increasing the volume of fluid within z-configuration actuator 200 may cause flexible regions 204 to distort, thereby separating rigid regions 206 from each other and causing an overall deformation of z-configuration actuator 200 along actuation axis 208. This deformation may cause z-configuration actuator 200 to deform and apply force along actuation axis 208. Although the example of FIG. 2 shows five rigid regions alternating with four flexible regions, z-configuration actuators may include any number of alternating rigid and flexible regions. Moreover, z-configuration actuators may be embedded within an elastic membrane to facilitate proper actuation and de-actuation of the z-configuration actuator. For example, a z-configuration actuator may be embedded within a thin rectangle of elastomeric material.

While the above example describes an example of actuating a z-configuration actuator using positive pressure, other embodiments of z-configuration actuators may be actuated using negative pressure. For example, a z-configuration actuator held in an "open" position by a rectangle of elastomeric material may be actuated by removing fluid from the interior of the actuator. Further embodiments may be actuated using a combination of positive and negative pressure. For example, a z-configuration actuator with a neutral position that is partially open may contract in length when fluid is removed from the interior chamber and extend in length when fluid is added. Alternatively, certain configurations of z-configuration actuators may extend when fluid is removed from the interior chamber and contract when fluid is added.

Figure 3:
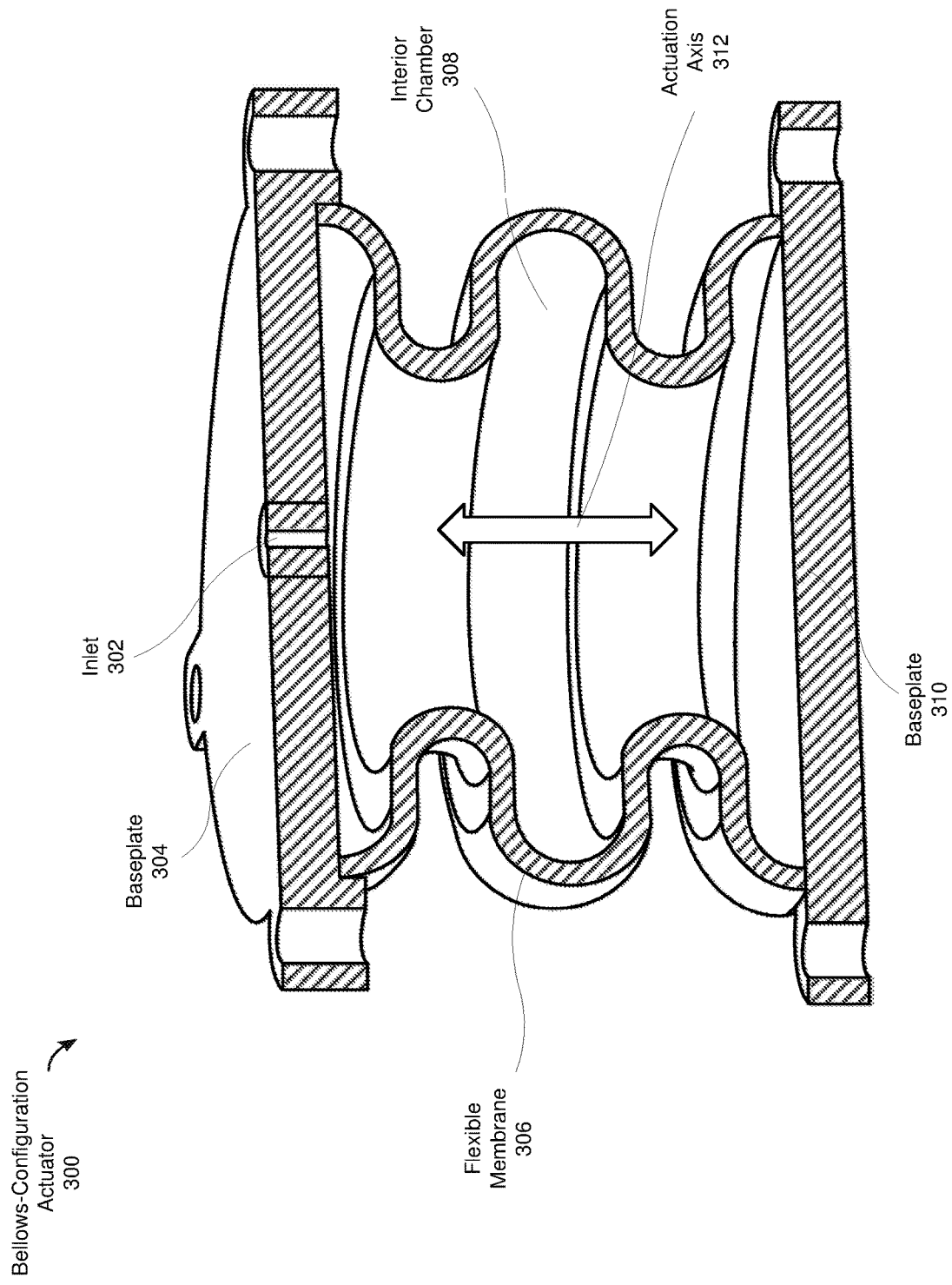
FIG. 3 is a schematic cutaway diagram of an example bellows-configuration actuator.

Additionally or alternatively, actuation system 100 may include one or more bellows-configuration actuators. FIG. 3 is a schematic cutaway diagram of an example bellows-configuration actuator 300. As illustrated in FIG. 3, bellows-configuration actuator 300 includes an inlet 302 that permits the passage of fluid through a baseplate 304. Baseplate 304 may be coupled to a support structure, such as support structure 104 in FIG. 1, to provide an anchor for bellows-configuration actuator 300. Similarly, bellows-configuration actuator 300 may include a baseplate 310 that is coupled to a contact surface, such as contact surface 112 in FIG. 1. Additionally, inlet 302 may be coupled to a corresponding inlet, such as inlet 102 in FIG. 1, that connects inlet 302 to an external control system. Inlet 302 may enable the external control system to alter the volume of fluid within interior chamber 308.

Bellows-configuration actuator 300 may also include a flexible membrane 306 disposed between baseplate 304 and baseplate 310 that is composed of a flexible and/or elastic material and encloses an interior chamber 308. Interior chamber 308 may be defined by the space enclosed by baseplate 304, baseplate 310, and flexible membrane 306. Flexible membrane 306 may be formed in a variety of shapes. In the example of FIG. 3, flexible membrane 306 includes several designated folds. Reducing the volume of fluid within interior chamber 308 (and thus lowering the internal pressure of bellows-configuration actuator 300) may cause flexible membrane 306 to compress along the designated folds, while increasing the volume of fluid may cause the bellows to lengthen through a combination of unfolding and stretching the material of flexible membrane 306. In some embodiments, the folds may be of varying sizes. For example, the shape of flexible membrane 306 may be configured such that certain folds will collapse within the space defined by other folds when bellows-configuration actuator 300 contracts along its actuation axis (illustrated as actuation axis 312).

Although a bellows-configuration may be actuated using either positive or negative pressure, some embodiments may actively produce only positive pressure or only negative pressure to actuate the bellows. For example, a pressure-reservoir control system may be capable of actively increasing the amount of fluid within an actuator chamber, but leverage the elasticity of the pliable regions (e.g., flexible membrane 306 in FIG. 3) to expel fluid from the interior chamber once the positive pressure is removed and return the actuator to a "resting" or "neutral" state. Similarly, a control system that only incorporates a vacuum pump may only be capable of removing fluid from the interior chambers of actuator chambers and rely on the elasticity of the pliable regions to refill the interior chambers and return the actuator to its resting state. Even systems that are capable of applying both negative and positive pressure to actuator chambers may leverage the elastic nature of the actuator chambers to reduce the amount of power required to control the actuation system.

Regardless of how the actuator is controlled, the pliable nature of a bellows-configuration actuator afforded by the flexible membrane may allow the bellows-configuration actuator to behave as a flexible joint even when it is not directly involved in applying actuation forces to the contact surface. For example, and with reference to FIG. 1, pressurizing the interior chamber of actuator chamber 108 while leaving actuator chambers 106 and 110 may cause actuator chamber 108 to exert a force against contact surface 112. However, because all three actuator chambers are coupled to contact surface 112, actuator chambers 106 and 110 may experience shear forces that deform the flexible membranes of actuator chambers 106 and 110.

Figure 4B:
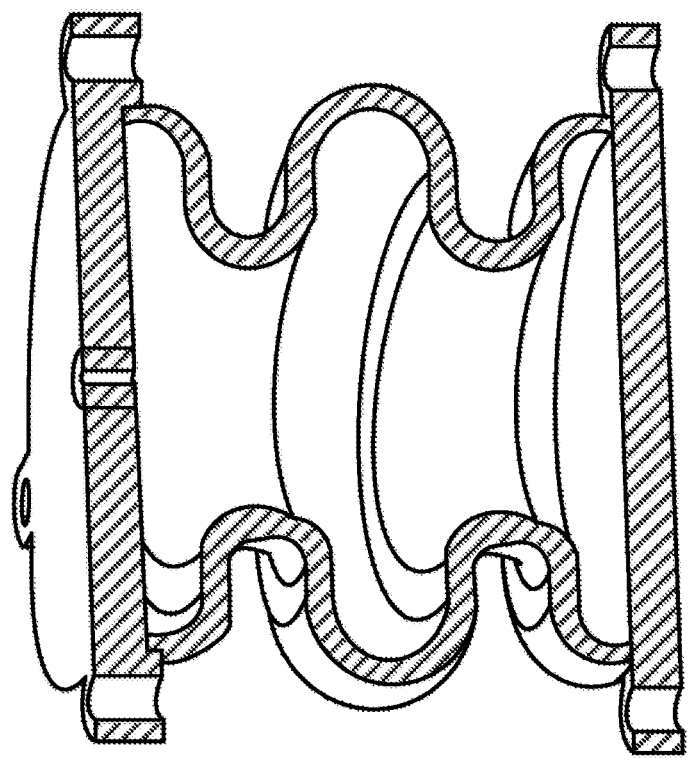
FIG. 4B is a schematic cutaway diagram of the example bellows-configuration actuator of FIG. 4A in an inflated state.
Figure 4A:
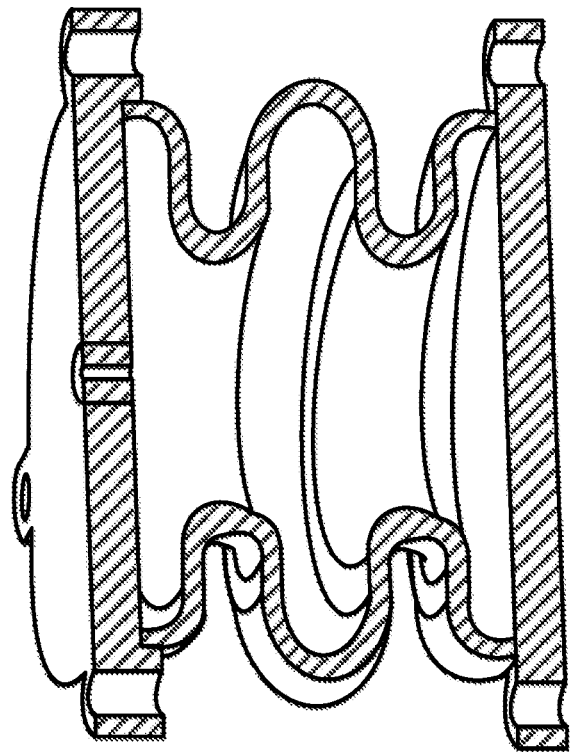
FIG. 4A is a schematic cutaway diagram of an example bellows-configuration actuator in a neutral state.

As described above, changing the volume of fluid within an actuator chamber may cause the actuator chamber to deform at least along the actuation axis of the actuator chamber. FIGS. 4A and 4B are cutaway schematic diagrams of bellows-configuration actuators as illustrated in FIG. 3. In FIG. 4A, bellows-configuration actuator 402 may be in a rest, neutral, or unpressurized state. That is, bellows-configuration actuator 402 represents a bellows-configuration actuator that has an interior pressure at equilibrium with atmospheric pressure. Adding fluid to the interior of bellows-configuration actuator 402 may cause it to distort, separating the baseplates and causing bellows-configuration actuator 402 to undergo a conformational change into bellows-configuration actuator 404 as illustrated in FIG. 4B. Conversely, removing or allowing fluid to escape from the interior of bellows-configuration actuator 404 may cause it to undergo a conformational change to adopt the configuration illustrated by bellows-configuration actuator 402.

The apparatuses, systems, and methods described herein may use any suitable fluid to control the internal pressure of the actuator chambers. In some embodiments, the apparatuses, systems, and methods described herein may use air and/or any other suitable gas as the fluid. In further embodiments, the actuator chambers may be filled with water, oil, or any other suitable liquid.

Similarly, control systems for the apparatuses and systems described herein may use any suitable method of controlling the internal pressure of the actuator chambers. For example, a control system for an air-based system may include a compressor component and a pressure reservoir. Such a system may pressurize actuator chambers from the pressure reservoir and allow the elasticity of the actuator chamber to depressurize the interior of the actuator chamber once the connection to the pressure reservoir is removed. As an additional example, actuators may be controlled by a pneumatic control system. In this example, each actuator chamber may be connected to a piston chamber at the control system. Such a piston-based control system may be a closed system, and thus be suitable for use with a wide variety of fluids. Altering the interior volume of the piston chamber at the control system may force fluid into or out of the interior of the actuator chamber, thereby causing a corresponding increase or decrease in the interior pressure of the actuator chamber. This change in pressure may accordingly cause the actuator chamber to distort and apply a force along the actuation axis of the actuator chamber.

Figure 5:
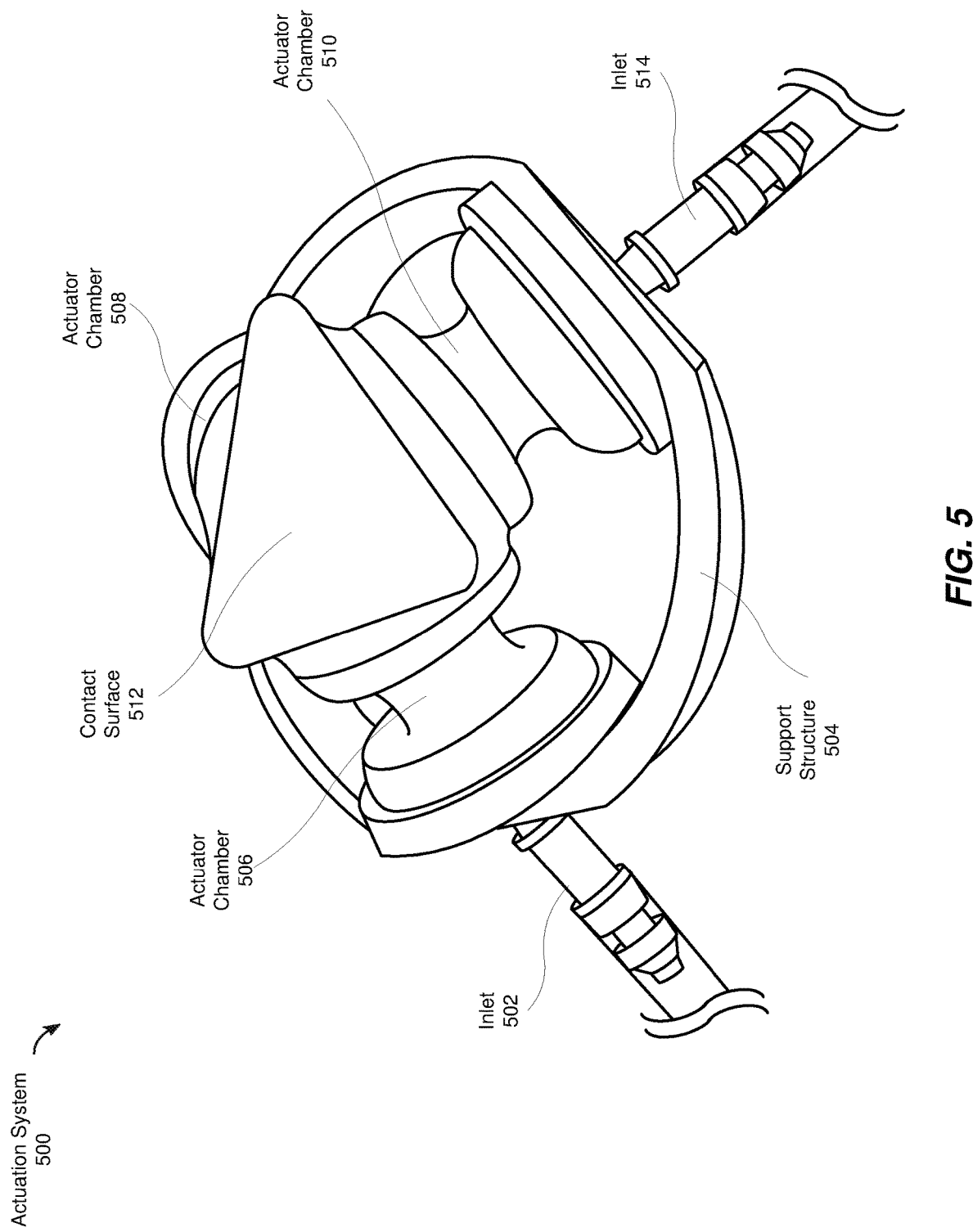
FIG. 5 is a schematic diagram of an example system for actuating a contact surface using tilted actuators.

Although the example of FIG. 1 shows an actuation system in which the actuation axes of each actuator chamber all reside within the same plane, other embodiments may incorporate actuation chambers with actuation axes that do not lie within the same plane. FIG. 5 is a schematic perspective diagram of an actuation system 500 that incorporates actuator chambers with actuation axes tilted off of the anchoring plane. As shown in FIG. 5, actuation system 500 includes a contact surface 512 and a support structure 504. Actuation system 500 also includes three actuator chambers, illustrated as actuator chambers 506, 508, and 510, that are coupled to and disposed between support structure 504 and contact surface 512. Each actuator chamber is connected to a corresponding inlet. Actuator chamber 506 is connected to inlet 502, actuator chamber 510 is connected to inlet 514, and actuator chamber 508 is connected to an inlet hidden by the perspective view. Although actuation system 500 may contain identical components to actuation system 100, the actuation axes of actuator chambers 506, 508, and 510 are tilted off the plane described by support structure 504. Actuation system 500 may therefore be able to move contact surface 512 with three dimensions of freedom. The parallel actuators in actuation system 100 whose actuation axes all reside within the same plane, by contrast, may only be capable of moving contact surface 112 with two dimensions of freedom.

In some situations, a control system may pressurize multiple actuator chambers of actuation system 500 simultaneously to produce a movement of contact surface 512 away from support structure 504. Simultaneously pressurizing all three actuation chambers may cause the lateral forces to cancel out, thereby causing the contact surface to actuate away from the plane in which the actuators reside. Similarly, only pressurizing one or two actuation chambers may cause the contact surface to move in the flat plane described by the anchor points of the actuators on support structure 504 in addition to causing the contact surface to move along the normal vector of that plane. Actuating actuation system 500 in this manner may enable actuation system 500 to, for example, apply pressure directly towards a user's fingertip.

Although the example actuation systems discussed above incorporate only actuators whose actuation axes lie within the same plane or only actuators whose actuation axes are tilted, some embodiments may include a combination of flat-plane actuators and tilted actuators, thereby enabling a control system to achieve finer-grained control over the positioning of the contact surface. For example, the array of flat-plane actuators may be used when only two dimensions of actuation are required, while the array of tilted actuators may be used when three dimensions of actuation are required. Additionally, combinations of flat-plane actuators and tilted actuators may be activated in conjunction with each other.

Moreover, various embodiments may include actuator chambers with actuation axes arranged in a variety of ways. The examples of FIGS. 1 and 5 illustrate actuation chambers whose actuation axes converge at a geometric center of the contact surface. Additionally or alternatively, an actuation system may include actuator chambers with actuation axes that are offset from a geometric center of the contact surface. In these examples, distortion of one or more of the actuator chambers may produce a rotational force upon the contact surface without necessarily causing a lateral translation of the contact surface.

In some embodiments, an actuator system may include one or more serial actuation chambers. The actuation axes of each independent interior chamber may be coaxial with each other. A serial actuator chamber may include at least two independent interior chambers that are each connected to independent inlets. Each independent interior chamber may be separated by baseplates and/or flexible membranes to enclose an independent volume of fluid. Serial actuation chambers may fulfill a similar role to the other above-described actuators described above. However, a control system may independently control the volume of fluid within each chamber of a serial actuator chamber, thereby independently controlling the overall length of the serial actuation chamber and the apparent stiffness of the serial actuation chamber. This decoupling of actuator length and apparent stiffness may allow for an actuator system that incorporates serial actuation chambers to produce a wider range of tactile feedback and haptic interaction than actuator systems that do not incorporate serial actuation chambers.

Figure 6:
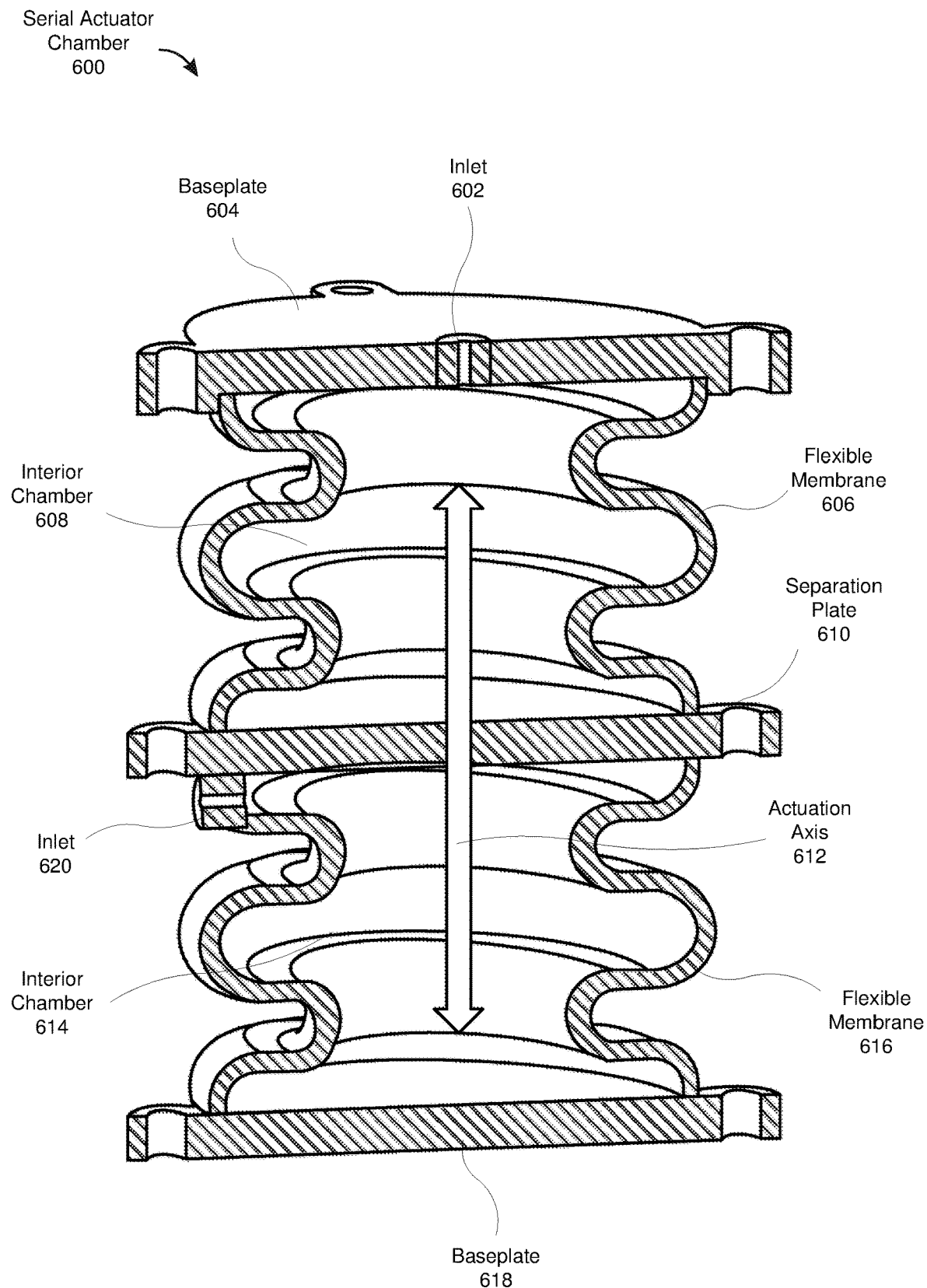
FIG. 6 is a schematic diagram of a serial actuation chamber.

FIG. 6 is a cutaway schematic diagram of an example serial actuation chamber 600. Serial actuation chamber 600 includes a baseplate 604, which may anchor serial actuation chamber 600 to a support structure, such as support structure 104 in FIG. 1. Serial actuation chamber 600 also includes a baseplate 618 which may anchor the other end of serial actuation chamber 600 to a contact surface, such as contact surface 112 in FIG. 1. As may be appreciated from this description and as mentioned above, serial actuation chamber 600 may fulfill the role of various actuator chambers within an actuation system, such as the roles filled by actuator chambers 106, 108, and 110 in FIG. 1. However, serial actuation chamber 600 includes multiple interior chambers, illustrated as interior chambers 608 and 614. In this example, each interior chamber is enclosed by a flexible membrane, and the two interior chambers are separated by a rigid separation plate 610. In other words, interior chamber 608 represents the space enclosed by flexible membrane 606, baseplate 604, and separation plate 610, while interior chamber 614 represents the space enclosed by flexible membrane 616, baseplate 618, and separation plate 610.

Each interior chamber may be connected to its own independent inlet. In the example of FIG. 6, interior chamber 608 is connected to inlet 602, which is set into baseplate 604. Meanwhile, interior chamber 614 is connected to inlet 620, which transects flexible membrane 616. These separate inlets may enable a control system to independently control the volume of fluid within each interior chamber, thereby causing distortions in the actuation chambers and causing the overall shape of serial actuation chamber 600 to expand or contract along actuation axis 612.

Although flexible membranes 606 and 616 are illustrated similarly dimensioned and configured flexible membranes, other embodiments of serial actuation chamber 600 may include interior chambers enclosed by flexible membranes of differing materials and/or configuration. For example, flexible membrane 606 may be manufactured out of a pliable material that readily deforms with a changing interior volume and/or pressure of fluid. Interior chamber 608 may thus be primarily responsible for controlling the actuation magnitude of serial actuation chamber 600. Meanwhile, flexible membrane 616 may be manufactured out of a less pliable material that does not deform as readily as flexible membrane 606 in this example. Interior chamber 614 may thus be primarily responsible for determining the overall apparent stiffness of serial actuator chamber 600. Additionally or alternatively, the flexible membranes of a serial actuator chamber may be configured with differing folding configurations, be manufactured to different thicknesses, or arranged in any suitable way to enhance the ability of that interior chamber to control either extension or apparent stiffness.

Furthermore, although serial actuation chamber 600 is illustrated as two serial bellows-configuration actuation chambers, a serial actuation chamber may include any number of actuation chambers of any suitable type. For example, a serial actuation chamber may include two serially coupled z-configuration actuators (such as z-configuration actuator 200 illustrated in FIG. 2), one z-configuration actuator and one bellows-configuration actuator, and/or any other suitable combination and/or number of actuators coupled in a serial fashion such that the actuation axes of the actuation chambers are coaxial with each other.

In some embodiments, an actuation system may be coupled to an anchoring system that holds the contact surface of the actuation system in contact with a portion of a user's hand. For example, an anchoring system or support structure may be configured to hold the contact surface of an actuation system in contact with a user's fingertip, palm, or other portion of the user's body. Movement of the contact surface may thus apply forces to the user's skin and accordingly may be incorporated into systems that produce haptic illusions, as will be discussed in greater detail below.

Figure 7:
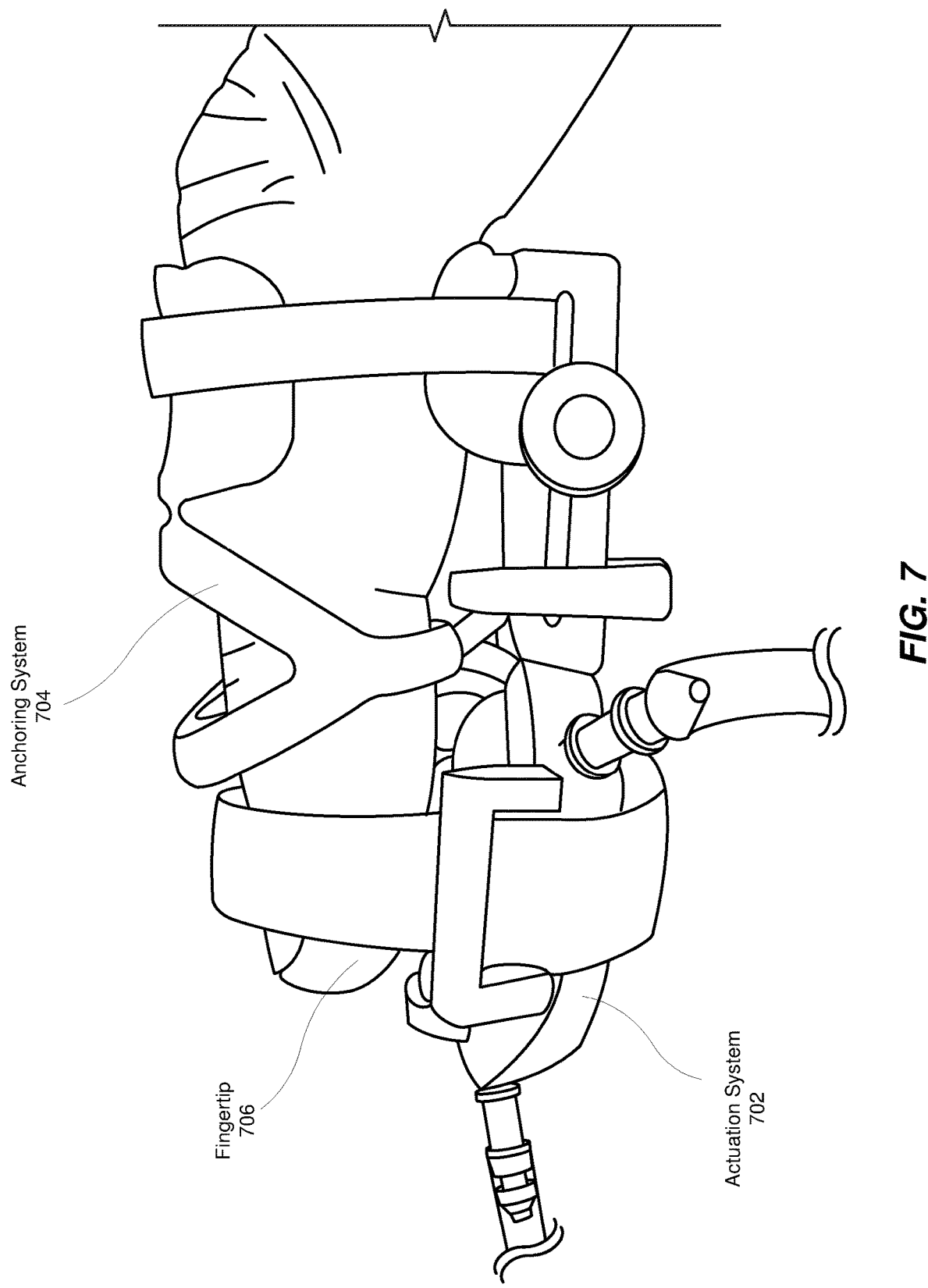
FIG. 7 is a schematic diagram of the actuation system of FIG. 1 held in contact with a user's fingertip by an anchoring system.

FIG. 7 is a schematic diagram of an example system in which an actuation system 700 is secured to a user's finger by anchoring system 704 such that the contact surface of actuation system 700 is held in contact with the user's fingertip, illustrated as fingertip 706. Actuation system 702 may generally represent any of the actuation systems described above, such as the flat-plane actuation system illustrated in FIG. 1 or the tilted-actuator system illustrated in FIG. 5. Anchoring system 704 may include any suitable number and/or arrangement of braces, straps, and/or other components that conform to the user's finger and couple anchoring system 704 to actuation system 702. In the example of FIG. 7, anchoring system 704 includes straps that secure actuation system 702 against fingertip 706, and rigid components that brace anchoring system 704 against the user's finger so that activation of actuation system 702 is capable of delivering force feedback to fingertip 706 without forcing actuation system 702 away from fingertip 706.

Figure 8:
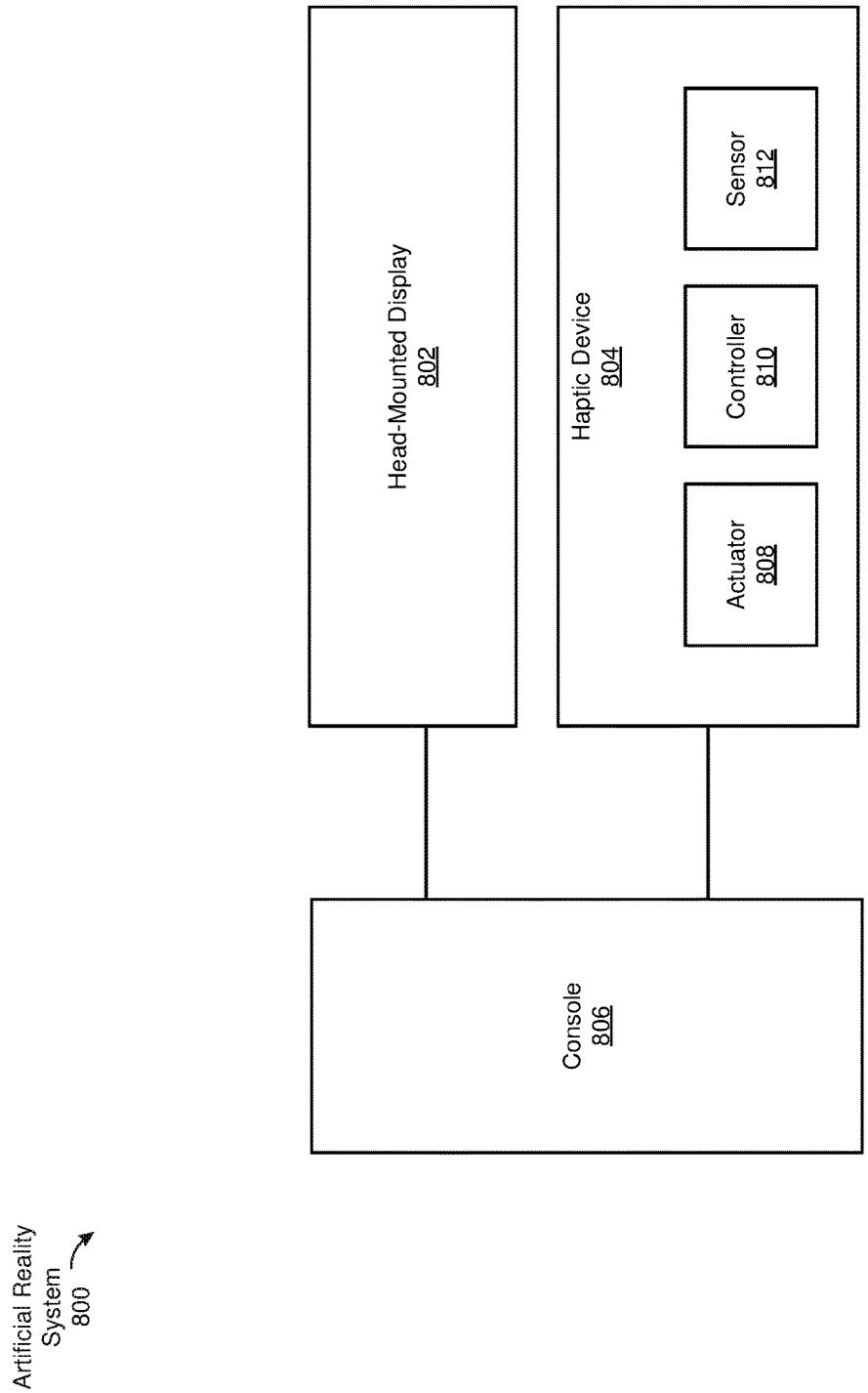
FIG. 8 is a block diagram of an exemplary artificial reality system that includes one or more fluidic devices, such as the fluidic device illustrated in FIG. 1.
Figure 9:
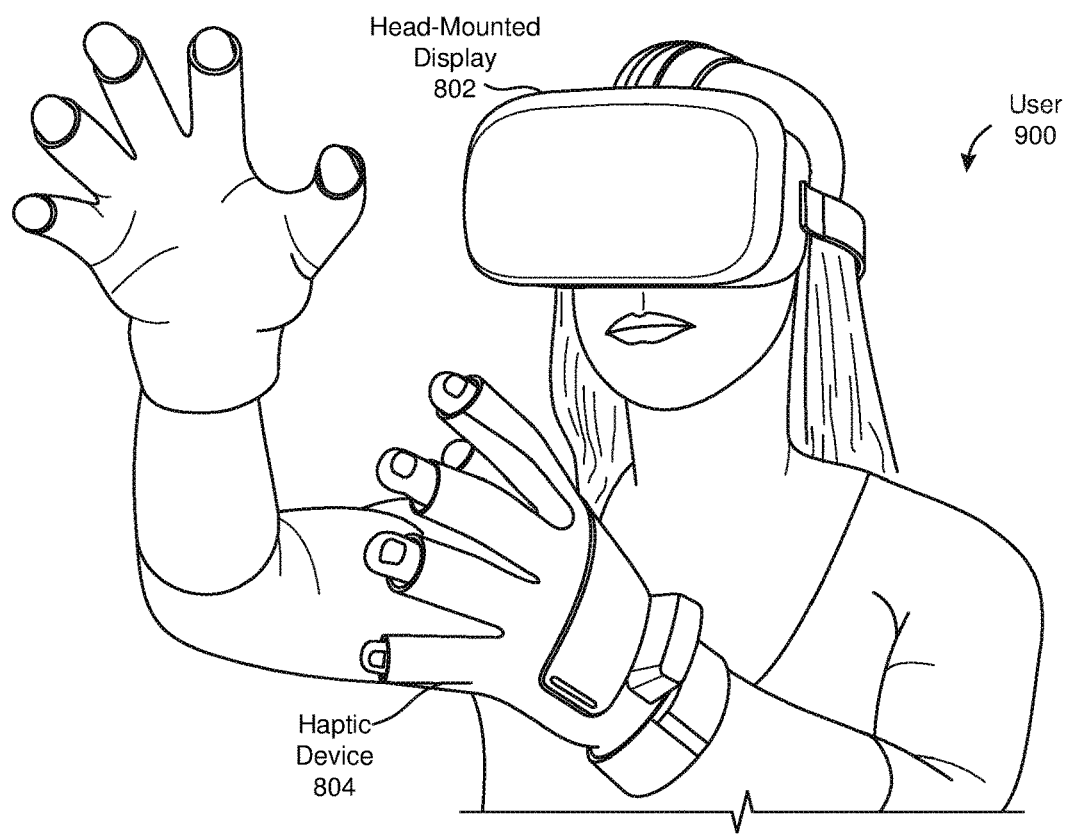
FIG. 9 is a perspective view of a user wearing an example head-mounted display and an example haptic glove within an artificial reality system, such as the example artificial reality system depicted in FIG. 8.

In some examples, actuation systems may be incorporated into artificial reality systems, augmented reality systems, virtual reality systems, mixed reality systems, and the like. While the following descriptions generally describe various embodiments of an artificial reality system, the described principles may be applied to any suitable artificial, augmented, virtual, and/or mixed reality system. FIG. 8 is a block diagram of an exemplary artificial reality system 800 that includes a head-mounted display 802 and a haptic device 804, each of which may be coupled to a console 806. In this example, a user may wear head-mounted display 802 around his or her head and/or may wear haptic device 804 (e.g., as a glove on one or both hands), as illustrated in FIG. 9. FIG. 9 is a perspective drawing of an exemplary embodiment of artificial reality system 800 in which a user 900 is wearing an exemplary embodiment of head-mounted display 802 and haptic device 804.

While FIG. 8 shows an example artificial reality system including one head-mounted display and one haptic assembly, and FIG. 9 shows an example artificial reality environment including one head-mounted display and two haptic devices, in other embodiments any number of these components may be included in an artificial reality system. For example, in some embodiments there may be multiple head-mounted displays each having an associated haptic device, with each head-mounted display and each haptic device communicating with the same console.

Head-mounted display 802 generally represents any type or form of assembly configured to present media representing an artificial reality to a user wearing the assembly. Examples of media presented by head-mounted display 802 include, without limitation, one or more images, video, and/or audio. In one example, audio may be presented via an external device (e.g., speakers and/or headphones) that receives audio information from head-mounted display 802 and/or console 806 and presents audio data via the external device based on the audio information.

In some embodiments, head-mounted display 802 may represent a virtual reality headset. In these embodiments, head-mounted display 802 may present views (e.g., images, video, sound, etc.) of a computer-generated reality. Additionally or alternatively, head-mounted display 802 may represent an augmented reality (AR) and/or mixed reality (MR) headset. In these embodiments, head-mounted display 802 augments views of a physical, real-world environment with computer-generated elements (e.g., images, video, sound, etc.).

Haptic device 804 generally represents any type or form of wearable device, worn by a user within an artificial reality system, that provides haptic feedback to the user to give the user the perception that he or she is physically engaging with a virtual object. In some embodiments, haptic device 804 may provide haptic feedback by applying a vibration, motion, and/or force to the user. For example, haptic device 804 may limit or augment a user's movement. To give a specific example, haptic device 804 may limit a user's hand from moving forward so that the user has the perception that his or her hand has come in physical contact with a virtual wall. In this specific example, one or more actuators within the haptic advice may achieve the physical movement restriction by pumping fluid into an inflatable bladder of the haptic device. In some examples, a user may also use haptic device 804 to send action requests to console 806. Examples of action requests include, without limitation, requests to start an application and/or end the application and/or requests to perform a particular action within the application.

In some embodiments, haptic device 804 may include a combination of various coupled fluidic devices (i.e., a composite fluidic device as described above in connection with FIG. 1). In one example, a circuitry within haptic device 804 may consist exclusively of fluidic devices. Alternatively, the circuitry within haptic device 804 may include a combination of fluidic devices and electrical devices, forming a combined fluidic/non-fluidic haptic device. The composite fluidic devices may be used to perform a variety of actions. For example, a composite fluidic device may operate as a controller 610 (e.g., addressing actuators included in haptic device 804 according to a haptic feedback signal from console 806). In another example, a composite fluidic device may act as a sensor 612 and/or as an actuator 808 within haptic device 804.

Figure 10:
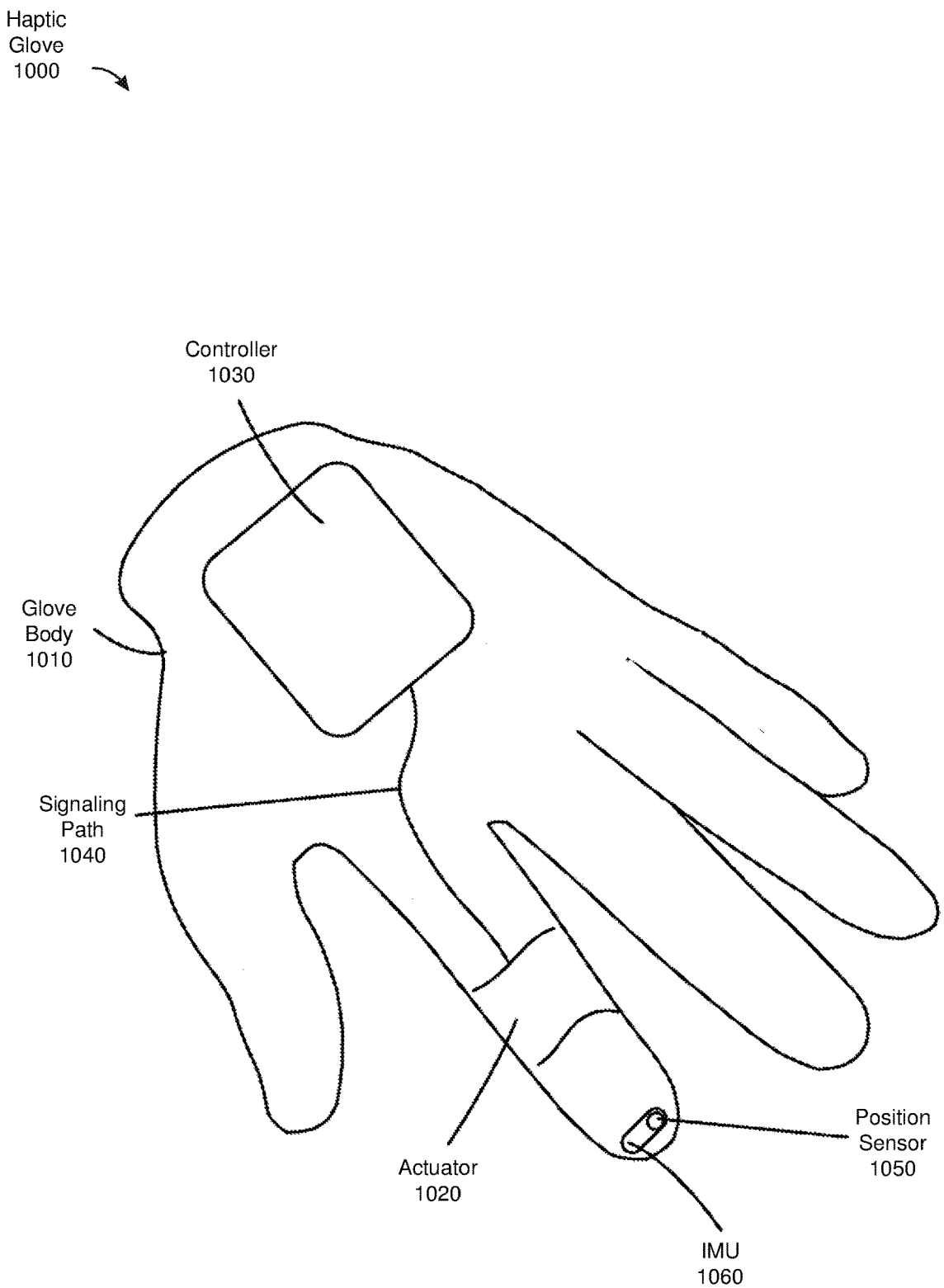
FIG. 10 is a perspective view of the exemplary haptic glove depicted in FIG. 9.

To give a specific simplified example of a fluidic circuitry operating within a haptic device, FIG. 10 illustrates an exemplary haptic glove 1000 with an assembly of interconnected fluidic devices configured to perform a variety of tasks. As shown in FIG. 10, haptic glove 1000 may be formed by a glove body 1010. In some examples, glove body 1010 may represent a garment and may be coupled to an assembly of haptic components such as an actuator 1020, a controller 1030, a signaling path 1040, a group of position sensors (including position sensor 1050), and/or one or more inertial measurement units (IMU) (including IMU 1060).

In some embodiments, one or more of these haptic components may be placed beneath an outer surface of glove body 1010, shielded from view. Additionally or alternatively, one or more of the haptic components may be placed on an outer surface of glove body 1010, such that the haptic components are visually detectable. In one example, position sensor 1050 may be coupled to a portion of glove body 1010 corresponding to a fingertip, as shown in FIG. 9. In this embodiment, (1) actuator 1020 may be coupled to a portion of glove body 1010 corresponding to a finger joint, (2) controller 1030 may be coupled to a portion of glove body 1010 corresponding to a dorsal side of a hand, and (3) signaling path 1040 may be coupled between controller 1030 and actuator 1020, as shown in FIG. 10.

In one example, the haptic assembly in FIG. 10 may be configured to collect location and/or motion data describing a physical position and/or movement of haptic glove 1000. In this example, position sensor 1050 may generate measurement signals in response to motion of haptic glove 1000. Position sensor 1050 may, in some embodiments, represent an accelerometer and/or a gyroscope that has at least one fluidic component. After generating the measurement signals, position sensor 1050 may transmit the measurement signals to IMU 1060. Then, IMU 1060 may rapidly sample the measurement signals (e.g., from position sensor 1050 and other position sensors within haptic glove 1000) and calculate the estimated position of haptic glove 1000 from the sampled measurements or transmit the sampled measurements to the console for the console to calculate the estimated position of haptic glove 1000. In this example, position sensor 1050 and/or IMU 1060 may be composed, at least in part, of one or more fluidic devices (including, e.g., actuation system 100).

In another example, the haptic assembly in FIG. 10 may be configured to instruct haptic glove 1000 to perform specific functions (e.g., based on instructions received from a console such as console 806 in FIG. 8). In this embodiment, controller 1030 may receive instructions (e.g., via a haptic feedback signal) from console 806 and actuate haptic glove 1000 according to the instructions via one or more actuators (such as actuator 1020). For example, controller 1030 may instruct actuator 1020 (e.g., via signaling path 1040) to pump fluid into an inflatable bladder to achieve a physical movement of a contact surface that is in contact with a user's hand. In this example, controller 1030 and/or actuator 1020 may be composed, at least in part, of a group of composable fluidic devices (including, e.g., fluidic device 100).

Embodiments of the instant disclosure may include or be implemented in conjunction with various types of artificial reality systems. Artificial reality is a form of reality that has been adjusted in some manner before presentation to a user, which may include, e.g., a virtual reality (VR), an augmented reality (AR), a mixed reality (MR), a hybrid reality, or some combination and/or derivative thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial reality systems may be implemented in a variety of different form factors and configurations. Some artificial reality systems may be designed to work without near-eye displays (NEDs), an example of which is AR system 1100 in FIG. 11. Other artificial reality systems may include an NED that also provides visibility into the real world (e.g., AR system 1200 in FIG. 12) or that visually immerses a user in an artificial reality (e.g., VR system 1300 in FIG. 3). While some artificial reality devices may be self-contained systems, other artificial reality devices may communicate and/or coordinate with external devices to provide an artificial reality experience to a user. Examples of such external devices include handheld controllers, mobile devices, desktop computers, devices worn by a user, devices worn by one or more other users, and/or any other suitable external system.

Figure 11:
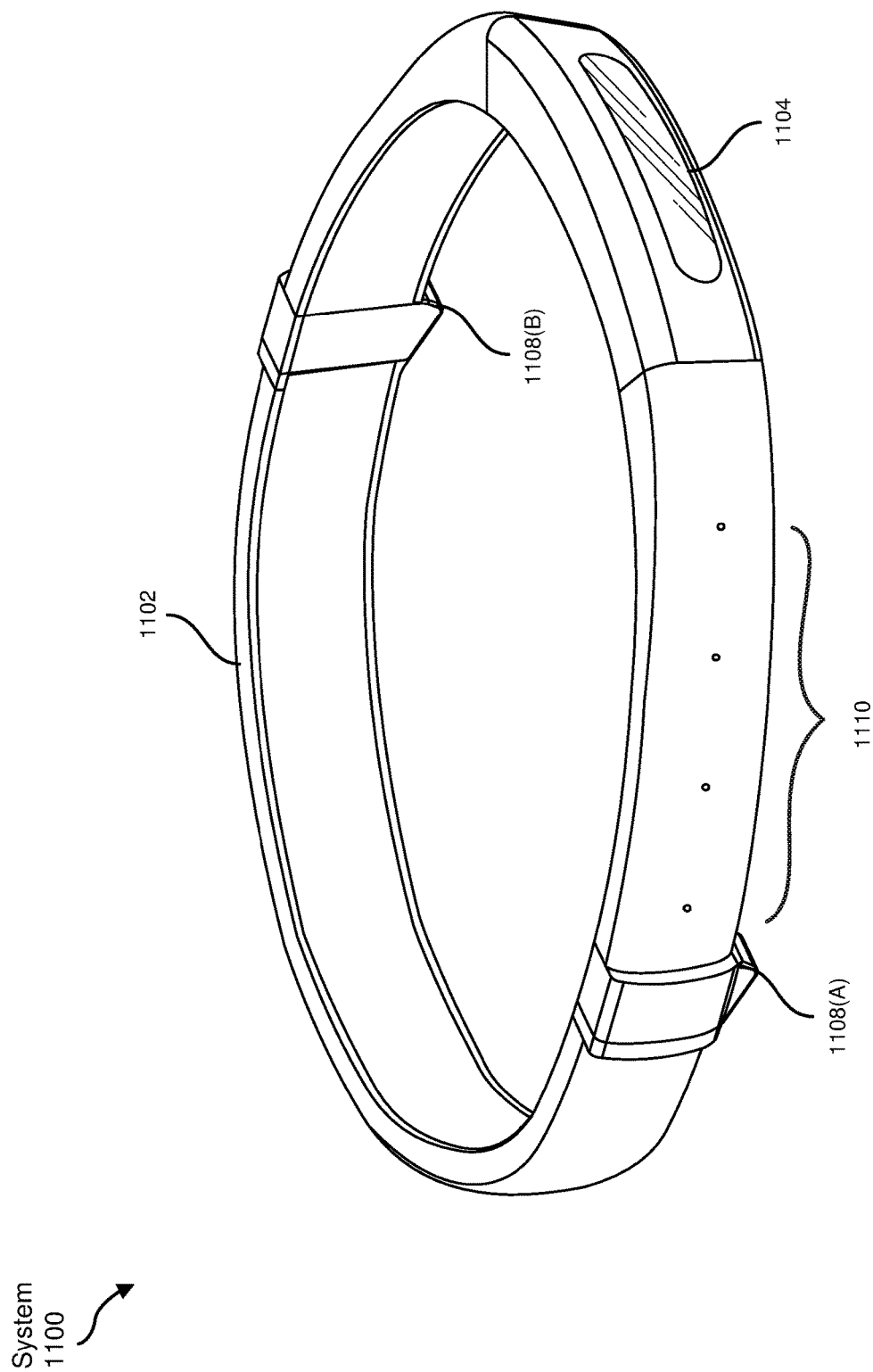
FIG. 11 is a schematic diagram of an example augmented reality system.

Turning to FIG. 11, AR system 1100 generally represents a wearable device dimensioned to fit about a body part (e.g., a head) of a user. As shown in FIG. 11, system 1100 may include a frame 1102 and a camera assembly 1104 that is coupled to frame 1102 and configured to gather information about a local environment by observing the local environment. AR system 1100 may also include one or more audio devices, such as output audio transducers 1108(A) and 1108(B) and input audio transducers 1110. Output audio transducers 1108(A) and 1108(B) may provide audio feedback and/or content to a user, and input audio transducers 1110 may capture audio in a user's environment.

As shown, AR system 1100 may not necessarily include an NED positioned in front of a user's eyes. AR systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While AR system 1100 may not include an NED, AR system 1100 may include other types of screens or visual feedback devices (e.g., a display screen integrated into a side of frame 1102).

Figure 12:
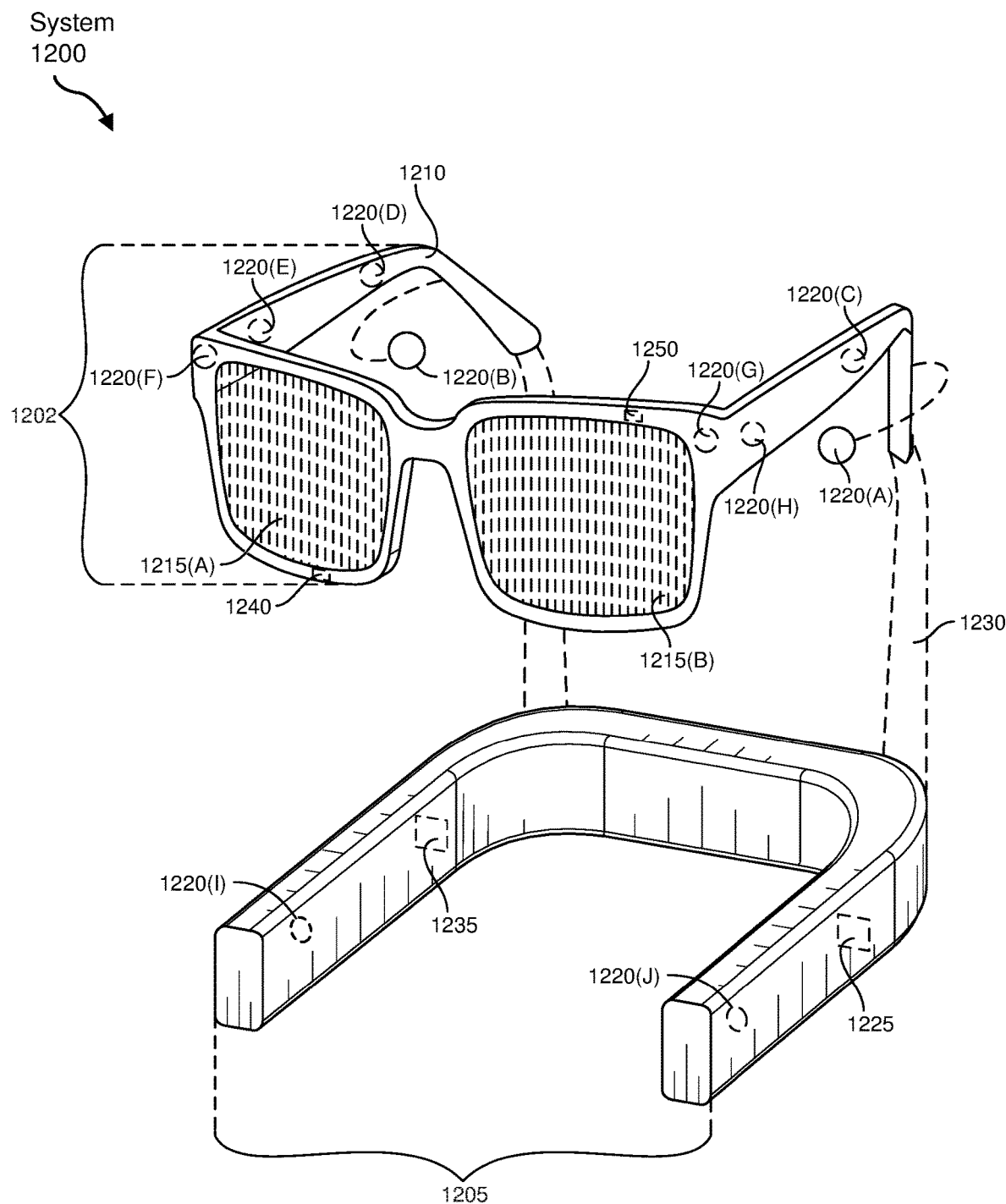
FIG. 12 is a schematic diagram of an additional example augmented reality system that incorporates glasses and a neckband.

The embodiments discussed in this disclosure may also be implemented in AR systems that include one or more NEDs. For example, as shown in FIG. 12, AR system 1200 may include an eyewear device 1202 with a frame 1210 configured to hold a left display device 1215(A) and a right display device 1215(B) in front of a user's eyes. Display devices 1215(A) and 1215(B) may act together or independently to present an image or series of images to a user. While AR system 1200 includes two displays, embodiments of this disclosure may be implemented in AR systems with a single NED or more than two NEDs.

In some embodiments, AR system 1200 may include one or more sensors, such as sensor 1240. Sensor 1240 may generate measurement signals in response to motion of AR system 1200 and may be located on substantially any portion of frame 1210. Sensor 1240 may include a position sensor, an inertial measurement unit (IMU), a depth camera assembly, or any combination thereof. In some embodiments, AR system 1200 may or may not include sensor 1240 or may include more than one sensor. In embodiments in which sensor 1240 includes an IMU, the IMU may generate calibration data based on measurement signals from sensor 1240. Examples of sensor 1240 may include, without limitation, accelerometers, gyroscopes, magnetometers, other suitable types of sensors that detect motion, sensors used for error correction of the IMU, or some combination thereof.

AR system 1200 may also include a microphone array with a plurality of acoustic sensors 1220(A)-1220(J), referred to collectively as acoustic sensors 1220. Acoustic sensors 1220 may be transducers that detect air pressure variations induced by sound waves. Each acoustic sensor 1220 may be configured to detect sound and convert the detected sound into an electronic format (e.g., an analog or digital format). The microphone array in FIG. 12 may include, for example, ten acoustic sensors: 1220(A) and 1220(B), which may be designed to be placed inside a corresponding ear of the user, acoustic sensors 1220(C), 1220(D), 1220(E), 1220(F), 1220(G), and 1220(H), which may be positioned at various locations on frame 1210, and/or acoustic sensors 1220(I) and 1220(J), which may be positioned on a corresponding neckband 1205.

The configuration of acoustic sensors 1220 of the microphone array may vary. While AR system 1200 is shown in FIG. 12 as having ten acoustic sensors 1220, the number of acoustic sensors 1220 may be greater or less than ten. In some embodiments, using higher numbers of acoustic sensors 1220 may increase the amount of audio information collected and/or the sensitivity and accuracy of the audio information. In contrast, using a lower number of acoustic sensors 1220 may decrease the computing power required by the controller 1250 to process the collected audio information. In addition, the position of each acoustic sensor 1220 of the microphone array may vary. For example, the position of an acoustic sensor 1220 may include a defined position on the user, a defined coordinate on the frame 1210, an orientation associated with each acoustic sensor, or some combination thereof.

Acoustic sensors 1220(A) and 1220(B) may be positioned on different parts of the user's ear, such as behind the pinna or within the auricle or fossa. Or, there may be additional acoustic sensors on or surrounding the ear in addition to acoustic sensors 1220 inside the ear canal. Having an acoustic sensor positioned next to an ear canal of a user may enable the microphone array to collect information on how sounds arrive at the ear canal. By positioning at least two of acoustic sensors 1220 on either side of a user's head (e.g., as binaural microphones), AR device 1200 may simulate binaural hearing and capture a 3D stereo sound field around about a user's head. In some embodiments, the acoustic sensors 1220(A) and 1220(B) may be connected to the AR system 1200 via a wired connection, and in other embodiments, the acoustic sensors 1220(A) and 1220(B) may be connected to the AR system 1200 via a wireless connection (e.g., a Bluetooth connection). In still other embodiments, the acoustic sensors 1220(A) and 1220(B) may not be used at all in conjunction with the AR system 1200.

Acoustic sensors 1220 on frame 1210 may be positioned along the length of the temples, across the bridge, above or below display devices 1215(A) and 1215(B), or some combination thereof. Acoustic sensors 1220 may be oriented such that the microphone array is able to detect sounds in a wide range of directions surrounding the user wearing the AR system 1200. In some embodiments, an optimization process may be performed during manufacturing of AR system 1200 to determine relative positioning of each acoustic sensor 1220 in the microphone array.

AR system 1200 may further include or be connected to an external device. (e.g., a paired device), such as neckband 1205. As shown, neckband 1205 may be coupled to eyewear device 1202 via one or more connectors 1230. The connectors 1230 may be wired or wireless connectors and may include electrical and/or non-electrical (e.g., structural) components. In some cases, the eyewear device 1202 and the neckband 1205 may operate independently without any wired or wireless connection between them. While FIG. 12 illustrates the components of eyewear device 1202 and neckband 1205 in example locations on eyewear device 1202 and neckband 1205, the components may be located elsewhere and/or distributed differently on eyewear device 1202 and/or neckband 1205. In some embodiments, the components of the eyewear device 1202 and neckband 1205 may be located on one or more additional peripheral devices paired with eyewear device 1202, neckband 1205, or some combination thereof. Furthermore, neckband 1205 generally represents any type or form of paired device. Thus, the following discussion of neckband 1205 may also apply to various other paired devices, such as smart watches, smart phones, wrist bands, other wearable devices, handheld controllers, tablet computers, laptop computers, etc.

Pairing external devices, such as neckband 1205, with AR eyewear devices may enable the eyewear devices to achieve the form factor of a pair of glasses while still providing sufficient battery and computation power for expanded capabilities. Some or all of the battery power, computational resources, and/or additional features of AR system 1200 may be provided by a paired device or shared between a paired device and an eyewear device, thus reducing the weight, heat profile, and form factor of the eyewear device overall while still retaining desired functionality. For example, neckband 1205 may allow components that would otherwise be included on an eyewear device to be included in neckband 1205 since users may tolerate a heavier weight load on their shoulders than they would tolerate on their heads. Neckband 1205 may also have a larger surface area over which to diffuse and disperse heat to the ambient environment. Thus, neckband 1205 may allow for greater battery and computation capacity than might otherwise have been possible on a stand-alone eyewear device. Since weight carried in neckband 1205 may be less invasive to a user than weight carried in eyewear device 1202, a user may tolerate wearing a lighter eyewear device and carrying or wearing the paired device for greater lengths of time than a the user would tolerate wearing a heavy standalone eyewear device, thereby enabling an artificial reality environment to be incorporated more fully into a user's day-to-day activities.

Neckband 1205 may be communicatively coupled with eyewear device 1202 and/or to other devices. The other devices may provide certain functions (e.g., tracking, localizing, depth mapping, processing, storage, etc.) to the AR system 1200. In the embodiment of FIG. 12, neckband 1205 may include two acoustic sensors (e.g., 1220(1) and 1220(J)) that are part of the microphone array (or potentially form their own microphone subarray). Neckband 1205 may also include a controller 1225 and a power source 1235.

Acoustic sensors 1220(1) and 1220(J) of neckband 1205 may be configured to detect sound and convert the detected sound into an electronic format (analog or digital). In the embodiment of FIG. 12, acoustic sensors 1220(1) and 1220(J) may be positioned on neckband 1205, thereby increasing the distance between the neckband acoustic sensors 1220(1) and 1220(J) and other acoustic sensors 1220 positioned on eyewear device 1202. In some cases, increasing the distance between acoustic sensors 1220 of the microphone array may improve the accuracy of beamforming performed via the microphone array. For example, if a sound is detected by acoustic sensors 1220(C) and 1220(D) and the distance between acoustic sensors 1220(C) and 1220(D) is greater than, e.g., the distance between acoustic sensors 1220(D) and 1220(E), the determined source location of the detected sound may be more accurate than if the sound had been detected by acoustic sensors 1220(D) and 1220(E).

Controller 1225 of neckband 1205 may process information generated by the sensors on neckband 1205 and/or AR system 1200. For example, controller 1225 may process information from the microphone array that describes sounds detected by the microphone array. For each detected sound, controller 1225 may perform a DoA estimation to estimate a direction from which the detected sound arrived at the microphone array. As the microphone array detects sounds, controller 1225 may populate an audio data set with the information. In embodiments in which AR system 1200 includes an inertial measurement unit, controller 1225 may compute all inertial and spatial calculations from the IMU located on eyewear device 1202. Connector 1230 may convey information between AR system 1200 and neckband 1205 and between AR system 1200 and controller 1225. The information may be in the form of optical data, electrical data, wireless data, or any other transmittable data form. Moving the processing of information generated by AR system 1200 to neckband 1205 may reduce weight and heat in eyewear device 1202, making it more comfortable to the user.

Power source 1235 in neckband 1205 may provide power to eyewear device 1202 and/or to neckband 1205. Power source 1235 may include, without limitation, lithium ion batteries, lithium-polymer batteries, primary lithium batteries, alkaline batteries, or any other form of power storage. In some cases, power source 1235 may be a wired power source. Including power source 1235 on neckband 1205 instead of on eyewear device 1202 may help better distribute the weight and heat generated by power source 1235.

As noted, some artificial reality systems may, instead of blending an artificial reality with actual reality, substantially replace one or more of a user's sensory perceptions of the real world with a virtual experience. One example of this type of system is a head-worn display system, such as VR system 1300 in FIG. 13, that mostly or completely covers a user's field of view. VR system 1300 may include a front rigid body 1302 and a band 1304 shaped to fit around a user's head. VR system 1300 may also include output audio transducers 1306(A) and 1306(B). Furthermore, while not shown in FIG. 13, front rigid body 1302 may include one or more electronic elements, including one or more electronic displays, one or more inertial measurement units (IMUs), one or more tracking emitters or detectors, and/or any other suitable device or system for creating an artificial reality experience.

Artificial reality systems may include a variety of types of visual feedback mechanisms. For example, display devices in AR system 1200 and/or VR system 1300 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in AR system 1200 and/or VR system 1300 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, AR system 1100, AR system 1200, and/or VR system 1300 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 11 and 13, output audio transducers 1108(A), 1108(B), 1306(A), and 1306(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 1110 may include condenser microphones, dynamic microphones, ribbon microphones, and/or any other type or form of input transducer. In some embodiments, a single transducer may be used for both audio input and audio output.

Figure 13:
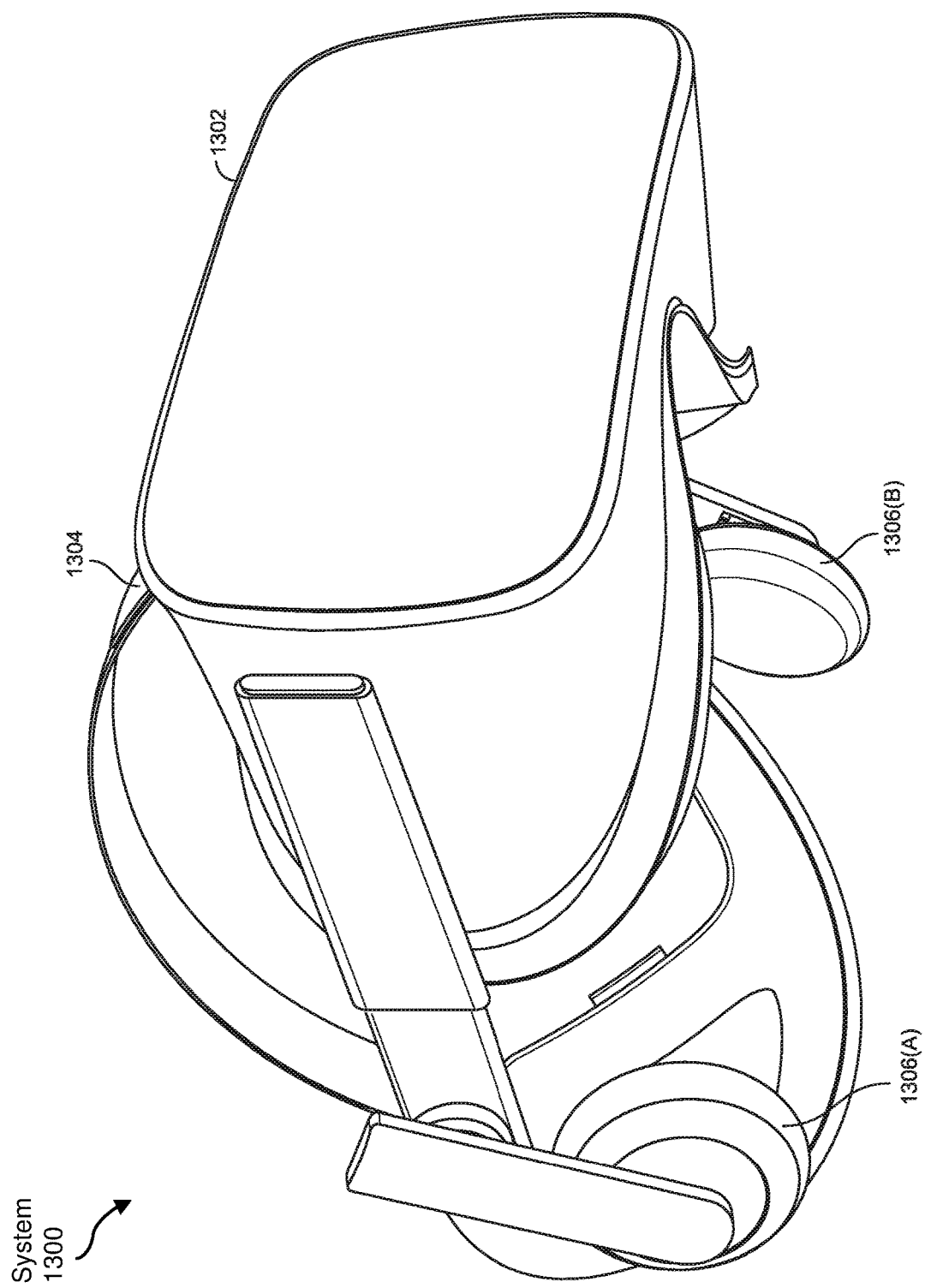
FIG. 13 is a schematic diagram of a virtual reality system.

While not shown in FIGS. 11-13, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

Some AR systems may map a user's environment using techniques referred to as "simultaneous location and mapping" (SLAM). SLAM mapping and location identifying techniques may involve a variety of hardware and software tools that can create or update a map of an environment while simultaneously keeping track of a user's location within the mapped environment. SLAM may use many different types of sensors to create a map and determine a user's position within the map.

SLAM techniques may, for example, implement optical sensors to determine a user's location. Radios including WiFi, Bluetooth, global positioning system (GPS), cellular or other communication devices may be also used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. AR and VR devices (such as systems 1100, 1200, and 1300 of FIGS. 11, 12, and 13, respectively) may incorporate any or all of these types of sensors to perform SLAM operations such as creating and continually updating maps of the user's current environment. In at least some of the embodiments described herein, SLAM data generated by these sensors may be referred to as "environmental data" and may indicate a user's current environment. This data may be stored in a local or remote data store (e.g., a cloud data store) and may be provided to a user's AR/VR device on demand.

When the user is wearing an AR headset or VR headset in a given environment, the user may be interacting with other users or other electronic devices that serve as audio sources. In some cases, it may be desirable to determine where the audio sources are located relative to the user and then present the audio sources to the user as if they were coming from the location of the audio source. The process of determining where the audio sources are located relative to the user may be referred to herein as "localization," and the process of rendering playback of the audio source signal to appear as if it is coming from a specific direction may be referred to herein as "spatialization."

Localizing an audio source may be performed in a variety of different ways. In some cases, an AR or VR headset may initiate a direction of arrival (DOA) analysis to determine the location of a sound source. The DOA analysis may include analyzing the intensity, spectra, and/or arrival time of each sound at the AR/VR device to determine the direction from which the sounds originated. In some cases, the DOA analysis may include any suitable algorithm for analyzing the surrounding acoustic environment in which the artificial reality device is located.

For example, the DOA analysis may be designed to receive input signals from a microphone and apply digital signal processing algorithms to the input signals to estimate the direction of arrival. These algorithms may include, for example, delay and sum algorithms where the input signal is sampled, and the resulting weighted and delayed versions of the sampled signal are averaged together to determine a direction of arrival. A least mean squared (LMS) algorithm may also be implemented to create an adaptive filter. This adaptive filter may then be used to identify differences in signal intensity, for example, or differences in time of arrival. These differences may then be used to estimate the direction of arrival. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct-path audio signal. Those bins having a portion of the direct-path signal may then be analyzed to identify the angle at which a microphone array received the direct-path audio signal. The determined angle may then be used to identify the direction of arrival for the received input signal. Other algorithms not listed above may also be used alone or in combination with the above algorithms to determine DOA.

In some embodiments, different users may perceive the source of a sound as coming from slightly different locations. This may be the result of each user having a unique head-related transfer function (HRTF), which may be dictated by a user's anatomy including ear canal length and the positioning of the ear drum. The artificial reality device may provide an alignment and orientation guide, which the user may follow to customize the sound signal presented to the user based on their unique HRTF. In some embodiments, an artificial reality device may implement one or more microphones to listen to sounds within the user's environment. The AR or VR headset may use a variety of different array transfer functions (e.g., any of the DOA algorithms identified above) to estimate the direction of arrival for the sounds. Once the direction of arrival has been determined, the artificial reality device may play back sounds to the user according to the user's unique HRTF. Accordingly, the DOA estimation generated using the array transfer function (ATF) may be used to determine the direction from which the sounds are to be played from. The playback sounds may be further refined based on how that specific user hears sounds according to the HRTF.

In addition to or as an alternative to performing a DOA estimation, an artificial reality device may perform localization based on information received from other types of sensors. These sensors may include cameras, IR sensors, heat sensors, motion sensors, GPS receivers, or in some cases, sensor that detect a user's eye movements. For example, as noted above, an artificial reality device may include an eye tracker or gaze detector that determines where the user is looking. Often, the user's eyes will look at the source of the sound, if only briefly. Such clues provided by the user's eyes may further aid in determining the location of a sound source. Other sensors such as cameras, heat sensors, and IR sensors may also indicate the location of a user, the location of an electronic device, or the location of another sound source. Any or all of the above methods may be used individually or in combination to determine the location of a sound source and may further be used to update the location of a sound source over time.

Some embodiments may implement the determined DOA to generate a more customized output audio signal for the user. For instance, an "acoustic transfer function" may characterize or define how a sound is received from a given location. More specifically, an acoustic transfer function may define the relationship between parameters of a sound at its source location and the parameters by which the sound signal is detected (e.g., detected by a microphone array or detected by a user's ear). An artificial reality device may include one or more acoustic sensors that detect sounds within range of the device. A controller of the artificial reality device may estimate a DOA for the detected sounds (using, e.g., any of the methods identified above) and, based on the parameters of the detected sounds, may generate an acoustic transfer function that is specific to the location of the device. This customized acoustic transfer function may thus be used to generate a spatialized output audio signal where the sound is perceived as coming from a specific location.

Indeed, once the location of the sound source or sources is known, the artificial reality device may re-render (i.e., spatialize) the sound signals to sound as if coming from the direction of that sound source. The artificial reality device may apply filters or other digital signal processing that alter the intensity, spectra, or arrival time of the sound signal. The digital signal processing may be applied in such a way that the sound signal is perceived as originating from the determined location. The artificial reality device may amplify or subdue certain frequencies or change the time that the signal arrives at each ear. In some cases, the artificial reality device may create an acoustic transfer function that is specific to the location of the device and the detected direction of arrival of the sound signal. In some embodiments, the artificial reality device may re-render the source signal in a stereo device or multi-speaker device (e.g., a surround sound device). In such cases, separate and distinct audio signals may be sent to each speaker. Each of these audio signals may be altered according to the user's HRTF and according to measurements of the user's location and the location of the sound source to sound as if they are coming from the determined location of the sound source. Accordingly, in this manner, the artificial reality device (or speakers associated with the device) may re-render an audio signal to sound as if originating from a specific location.

Figure 14:
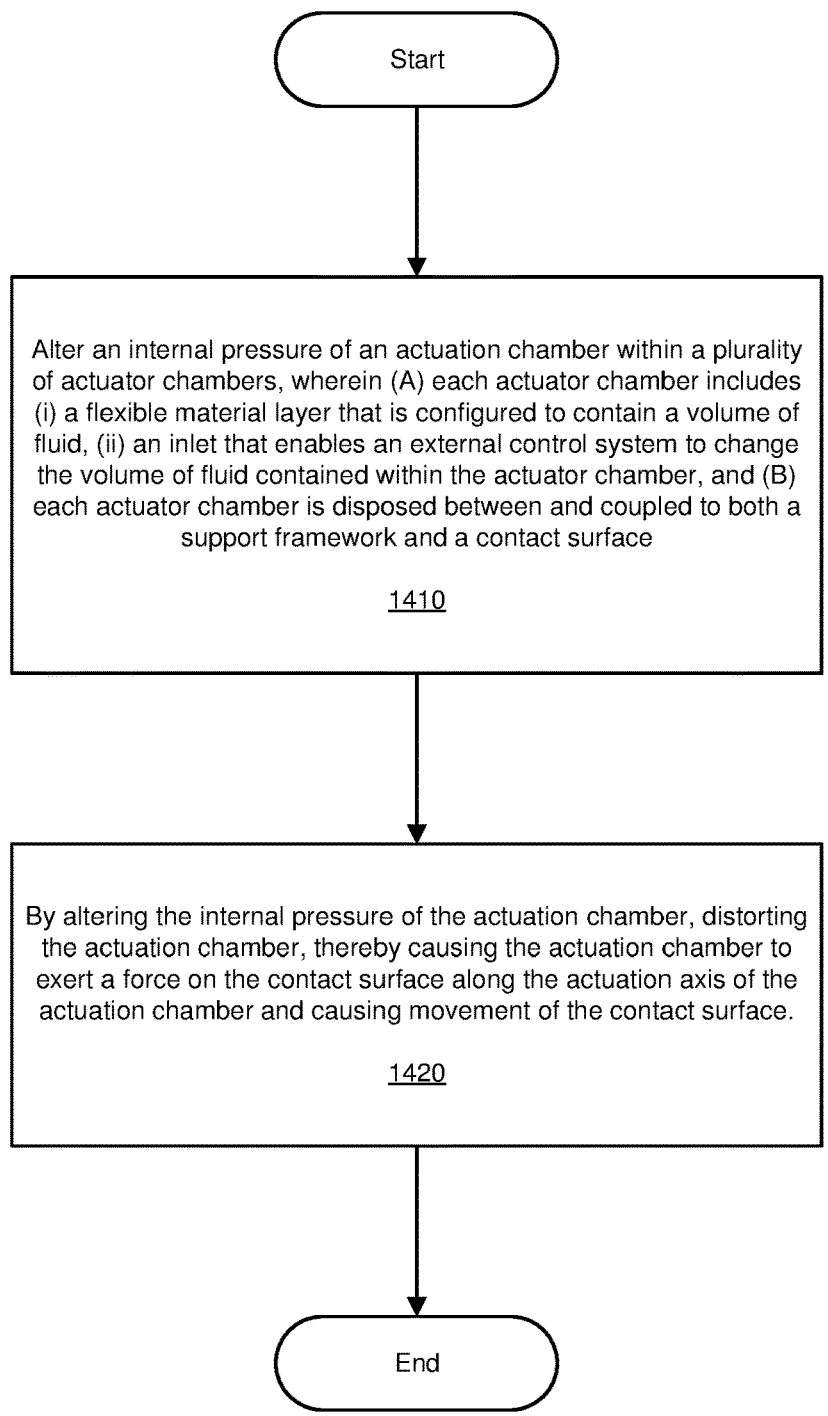
FIG. 14 is a flow diagram illustrating an example method for actuating a contact surface.

FIG. 14 is a flow diagram of an example method 1400 for actuating a contact surface. As shown at step 1410 in FIG. 14, the method may include altering an internal pressure of an actuation chamber within a plurality of actuator chambers, wherein (A) each actuator chamber includes (i) a flexible material layer that is configured to contain a volume of fluid, (ii) an inlet that enables an external control system to change the volume of fluid contained within the actuator chamber, and (B) each actuator chamber is disposed between and coupled to both a support framework and a contact surface.

At step 1420 of FIG. 14, the method may include distorting the actuation chamber by altering the internal pressure of the actuation chamber, thereby causing the actuation chamber to exert a force on the contact surface along the actuation axis of the actuation chamber and causing movement of the contact surface.

Although the above examples generally focus on using collective actuation systems to provide haptic feedback in virtual or augmented reality systems, the actuation systems described herein may be used in a variety of other contexts. For example, actuation systems may be incorporated at key joints in a structure to dampen vibrations by modulating the apparent stiffness of the structure at those joints. As a specific example, actuation systems may be incorporated into the struts of a server rack to dampen fan vibrations by modulating the apparent stiffness of the joints where the struts connect to a server tray. As the vibrations produced by fans may change over time depending on server load and/or other factors, a server rack that incorporates actuation systems to dampen vibrations may efficiently dampen any arbitrary vibration pattern and reduce maintenance costs of various parts of the server rack. As an additional example, groups of actuation systems may be controlled together to produce various behaviors. For example, a controller may be configured to manage an array of actuation systems as "feet" to "walk" an object across a surface.

As described in greater detail above, the described apparatuses, systems, and methods may use a variety of soft, pliable, and/or elastic actuation chambers to provide fine-grained control over a contact surface in a form factor that is suitable for a variety of applications, from vibrational or acoustic dampening to haptic feedback in virtual reality systems. These pliable actuation chambers may resist mechanical locking experienced by traditional systems and allow for a greater range of physical sensations to be applied to a user's skin.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
   a plurality of actuator chambers, wherein each actuator chamber comprises:
     a flexible material layer that is configured to contain a volume of fluid such that changing the volume of fluid contained within the actuator chamber causes the actuator chamber to distort at least along an actuation axis; and
     an inlet that enables an external control system to change the volume of fluid contained within the actuator chamber;
   a contact surface that is coupled to each actuator chamber in the plurality of actuator chambers; and
   a support framework that is coupled to the plurality of actuator chambers such that:
     the plurality of actuator chambers is disposed between the support framework and the contact surface; and
     distortion of actuator chambers in the plurality of actuator chambers causes the plurality of actuator chambers to exert forces on the contact surface, thereby causing movement of the contact surface with at least two degrees of freedom; and
   a support structure that is configured to secure the apparatus to a user's finger such that the contact surface maintains physical contact with a user's finger.

2. The apparatus of claim 1, wherein the plurality of actuator chambers comprises a plurality of bellows-configuration actuator chambers, wherein distortion of a bellows-configuration actuator chamber causes the bellows-configuration actuator chamber to exert a force along the actuation axis of the bellows-configuration actuator chamber.

3. The apparatus of claim 1, wherein the plurality of actuator chambers comprises a plurality of zig-zag configuration actuator chambers, wherein each zig-zag configuration actuator chamber comprises rigid segments alternating with flexible corner segments such that increasing the volume of fluid enclosed by the zig-zag configuration actuator chamber causes the flexible corner segments to distort, thereby separating the rigid segments and applying a force along the actuation axis of the zig-zag configuration actuator chamber.

4. The apparatus of claim 1, wherein the actuation axis of each actuator chamber in the plurality of actuator chambers lies along a single plane, thereby enabling the plurality of actuation chambers to move the contact surface with two degrees of freedom.

5. The apparatus of claim 1, wherein the actuation axis of each actuator chamber in the plurality of actuator chambers is angled towards an outer surface of the contact surface, thereby enabling the plurality of actuation chambers to move the contact surface with three degrees of freedom.

6. The apparatus of claim 1, wherein the actuation axis of each actuator chamber in the plurality of actuator chambers is offset from the center of the contact surface such that distortion of the plurality of actuator chambers effects a rotational force upon the contact surface.

7. The apparatus of claim 1, wherein the plurality of actuator chambers comprises serial actuator chambers that each comprise at least two independent interior chambers that each comprise an independent inlet, thereby enabling each independent interior chamber to contain an independent volume of fluid.

8. The apparatus of claim 1, wherein the fluid comprises a gas.

9. A system comprising:
a plurality of haptic feedback apparatuses, wherein each haptic feedback apparatus comprises:
a plurality of actuator chambers, wherein each actuator chamber comprises:
a flexible material layer that is configured to contain a volume of fluid such that changing the volume of fluid contained within the actuator chamber causes the actuator chamber to distort at least along an actuation axis; and
an inlet that enables an external control system to change the volume of fluid contained within the actuator chamber;
a contact surface that is coupled to each actuator chamber in the plurality of actuator chambers; and
a support framework that is coupled to the plurality of actuator chambers such that:
the plurality of actuator chambers is disposed between the support framework and the contact surface; and
distortion of actuator chambers in the plurality of actuator chambers causes the plurality of actuator chambers to exert forces on the contact surface, thereby causing movement of the contact surface with at least two degrees of freedom; and
a flexible support component that is configured to fit over a user's hand and hold the contact surface of each haptic feedback apparatus in physical contact with a corresponding portion of the user's hand.

10. The system of claim 9, wherein the plurality of actuator chambers comprises a plurality of bellows-configuration actuator chambers, wherein distortion of a bellows-configuration actuator chamber causes the bellows-configuration actuator chamber to exert a force along the actuation axis of the bellows-configuration actuator chamber.

11. The system of claim 9, wherein the actuation axis of each actuator chamber in the plurality of actuator chambers lies along a single plane, thereby enabling the plurality of actuation chambers to move the contact surface with two degrees of freedom.

12. The system of claim 9, wherein the actuation axis of each actuator chamber in the plurality of actuator chambers is angled towards an outer surface of the contact surface, thereby enabling the plurality of actuation chambers to move the contact surface with three degrees of freedom.

13. The system of claim 9, wherein the actuation axis of each actuator chamber in the plurality of actuator chambers is offset from the center of the contact surface such that distortion of the plurality of actuator chambers effects a rotational force upon the contact surface.

14. The system of claim 9, wherein the plurality of actuator chambers comprises serial actuator chambers that each comprise at least two independent interior chambers that each comprise an independent inlet, thereby enabling each independent interior chamber to contain an independent volume of fluid.

15. The system of claim 9, wherein the fluid comprises a gas.

16. A method comprising:
altering an internal pressure of an actuation chamber within a plurality of actuator chambers, wherein:
each actuator chamber comprises:
a flexible material layer that is configured to contain a volume of fluid such that changing the volume of fluid contained within the actuator chamber causes the actuator chamber to distort at least along an actuation axis; and
an inlet that enables an external control system to change the volume of fluid contained within the actuator chamber;
each actuator chamber in the plurality of actuator chambers is disposed between and coupled to both a support framework and a contact surface; and
the support framework is configured to hold the contact surface in physical contact with a user's finger; and
by altering the internal pressure of the actuation chamber, distorting the actuation chamber, thereby causing the actuation chamber to exert a force on the contact surface along the actuation axis of the actuation chamber and causing movement of the contact surface with at least two degrees of freedom.

17. The method of claim 16, wherein the actuation axis of each actuator chamber in the plurality of actuator chambers lies along a single plane, thereby enabling the plurality of actuation chambers to move the contact surface with two degrees of freedom.

18. The method of claim 16, wherein the actuation axis of each actuator chamber in the plurality of actuator chambers is angled towards an outer surface of the contact surface, thereby enabling the plurality of actuation chambers to move the contact surface with three degrees of freedom.

19. The method of claim 16, wherein the actuation axis of each actuator chamber in the plurality of actuator chambers is offset from the center of the contact surface such that distortion of the plurality of actuator chambers effects a rotational force upon the contact surface.

* * * * *